US012515454B2

(12) United States Patent
Hagiwara

(10) Patent No.: US 12,515,454 B2
(45) Date of Patent: Jan. 6, 2026

(54) LIQUID EJECTING HEAD, LIQUID EJECTING HEAD UNIT, AND LIQUID EJECTING APPARATUS

(71) Applicant: SEIKO EPSON CORPORATION, Tokyo (JP)

(72) Inventor: Hiroyuki Hagiwara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 214 days.

(21) Appl. No.: 18/336,242

(22) Filed: Jun. 16, 2023

(65) Prior Publication Data

US 2023/0405992 A1 Dec. 21, 2023

(30) Foreign Application Priority Data

Jun. 20, 2022 (JP) ................................ 2022-098686

(51) Int. Cl.
*B41J 2/14* (2006.01)
*B41J 2/15* (2006.01)
*B41J 2/155* (2006.01)

(52) U.S. Cl.
CPC ......... *B41J 2/14233* (2013.01); *B41J 2/1433* (2013.01); *B41J 2/155* (2013.01)

(58) Field of Classification Search
CPC ....... B41J 2/1433; B41J 2/14233; B41J 2/155
See application file for complete search history.

(56) References Cited

U.S. PATENT DOCUMENTS

| | | | | |
|---|---|---|---|---|
| 2007/0046727 | A1* | 3/2007 | Yanagisawa | B41J 2/161 347/47 |
| 2009/0284566 | A1* | 11/2009 | Suzuki | B41J 2/16538 347/38 |
| 2015/0174901 | A1 | 6/2015 | Akahane | |
| 2015/0246541 | A1* | 9/2015 | Miyajima | B41J 2/14233 347/32 |
| 2017/0096004 | A1* | 4/2017 | Dowell | B41J 2/155 |
| 2017/0291418 | A1 | 10/2017 | Emi | |
| 2018/0339517 | A1* | 11/2018 | Saiba | B41J 2/164 |
| 2020/0139732 | A1* | 5/2020 | Naruse | B41J 25/006 |
| 2022/0032640 | A1 | 2/2022 | Kanegae | |

FOREIGN PATENT DOCUMENTS

| | | | |
|---|---|---|---|
| JP | 2015-120292 | A | 7/2015 |
| JP | 2017-185776 | A | 10/2017 |
| JP | 2020-006576 | A | 1/2020 |
| JP | 2020-199675 | A | 12/2020 |
| JP | 2022-025894 | A | 2/2022 |
| JP | 2022-027178 | A | 2/2022 |

* cited by examiner

*Primary Examiner* — Jason S Uhlenhake
(74) *Attorney, Agent, or Firm* — WORKMAN NYDEGGER

(57) ABSTRACT

There are provided a first head chip including a first nozzle plate and having a first direction as a longitudinal direction; a second head chip including a second nozzle plate and having the first direction as a longitudinal direction; a fixing plate which has a first opening portion and a second opening portion, and to which the first head chip and the second head chip are fixed; and a protection section protruding in an ejection direction from a surface of the fixing plate, and the protection section is arranged between the first head chip and the second head chip in a second direction orthogonal to both the ejection direction and the first direction.

20 Claims, 23 Drawing Sheets

LIQUID EJECTING HEAD, LIQUID EJECTING HEAD UNIT, AND LIQUID EJECTING APPARATUS

The present application is based on, and claims priority from JP Application Serial Number 2022-098686, filed Jun. 20, 2022, the disclosure of which is hereby incorporated by reference herein in its entirety.

BACKGROUND

1. Technical Field

The present disclosure relates to a liquid ejecting head that ejects a liquid from a nozzle, a liquid ejecting head unit including the liquid ejecting head, and a liquid ejecting apparatus.

2. Related Art

A liquid ejecting apparatus represented by an ink jet type recording apparatus includes a liquid ejecting head represented by an ink jet type recording head capable of discharging ink stored in a liquid storage section such as an ink cartridge or an ink tank as ink droplets.

There is disclosed a liquid ejecting head including a head chip having a nozzle array in which nozzles are arranged in parallel, and a fixing plate formed with an opening portion to which a plurality of head chips are fixed and which exposes the nozzle array to the outside, in which the nozzle array extends by fixing the plurality of head chips to the fixing plate, and mutual nozzle position accuracy between the head chips is improved (for example, refer to JP-A-2022-025894).

Further, there is disclosed a liquid ejecting apparatus in which a medium such as paper or a sheet is transported along a surface of a rotating drum and printing is performed by a liquid ejecting head (for example, refer to JP-A-2022-006576).

However, when printing is performed on a medium on the surface of the rotating drum as in JP-A-2022-006576, using the liquid ejecting head of JP-A-2022-025894, the center of the fixing plate in the lateral direction is closest to the surface of the rotating drum in order to minimize the gap between the liquid ejecting head and the medium. Therefore, when a paper jam, a so-called medium jam, occurs at the center of the fixing plate in the lateral direction, the fixing plate is likely to come into contact with the medium. Further, even in a configuration in which printing is performed while rotating a cylindrical medium, not limited to the medium transported on the surface of a rotating drum, when the curvature of the medium is not constant, the rotation shaft of the medium is tilted, or the rotation shaft is shifted from the center of the cylindrical medium, the medium is likely to come into contact with the center of the fixing plate, which has the narrowest gap with the cylindrical medium, in the lateral direction. The fixing plate is formed thin in order to narrow the gap from the medium, and has relatively low rigidity. Therefore, when the medium comes into contact with the fixing plate, there is a concern that the fixing plate is deformed. When the fixing plate is deformed in this manner, there is a concern about problems that ink remains in a recess on the surface of the fixing plate, a landing position of the ink on the medium is shifted due to the shift of the ink ejected from the nozzle in the ejection direction, or peeling of the fixing plate and the head chip causes ink to enter the space accommodating the head chip.

SUMMARY

According to an aspect of the present disclosure, there is provided a liquid ejecting head including: a first head chip including a first nozzle plate formed with a plurality of nozzles for ejecting liquid in an ejection direction, and having a first direction as a longitudinal direction when viewed in the ejection direction; a second head chip including a second nozzle plate formed with a plurality of nozzles for ejecting liquid in the ejection direction, and having the first direction as a longitudinal direction when viewed in the ejection direction; a fixing plate which has a first opening portion exposing at least a part of the first nozzle plate and a second opening portion exposing at least a part of the second nozzle plate, and to which the first head chip and the second head chip are fixed; and a protection section protruding in the ejection direction from a surface of the fixing plate formed with the first opening portion, in which the first head chip and the second head chip are shifted from each other in the first direction and in a second direction orthogonal to both the ejection direction and the first direction, respectively, and partially overlap each other when viewed in the second direction, and the protection section is arranged between the first head chip and the second head chip in the second direction.

According to another aspect of the present disclosure, there is provided a liquid ejecting head that ejects liquid to a medium moving in a transport direction, including: a first head chip including a first nozzle plate formed with a plurality of nozzles for ejecting liquid in an ejection direction; a second head chip including a second nozzle plate formed with a plurality of nozzles for ejecting liquid in the ejection direction; a fixing plate which has a first opening portion exposing at least a part of the first nozzle plate and a second opening portion exposing at least a part of the second nozzle plate, and to which the first head chip and the second head chip are fixed; and a protection section protruding in the ejection direction from a surface of the fixing plate formed with the first opening portion, in which the protection section is arranged between the first head chip and the second head chip in the transport direction.

According to still another aspect of the present disclosure, there is provided a liquid ejecting apparatus including: the liquid ejecting head according to the above aspect; and a liquid storage section for storing liquid to be supplied to the liquid ejecting head.

According to still another aspect of the present disclosure, there is provided a liquid ejecting apparatus including: a cylindrical member that rotates around a rotation shaft extending in a first direction; and the liquid ejecting head according to above aspect, which is arranged along the cylindrical member, in which, when a tangent plane at a specific position on a surface of the cylindrical member is parallel to the surface of the fixing plate when viewed in the first direction, a normal line of the tangent plane at the specific position overlaps the protection section.

According to still another aspect of the present disclosure, there is provided a liquid ejecting apparatus including: a cylindrical member that rotates around a rotation shaft extending in a first direction orthogonal to both the transport direction and the ejection direction; and the liquid ejecting head according to the above aspect, which is arranged along the cylindrical member, in which, when a tangent plane at a specific position on a surface of the cylindrical member is parallel to the surface of the fixing plate when viewed in the first direction, a normal line of the tangent plane at the specific position overlaps the protection section.

According to still another aspect of the present disclosure, there is provided a liquid ejecting apparatus including: the liquid ejecting head according to the above aspect; and a wiping member that wipes an ejection surface including the first nozzle plate, the second nozzle plate, and the surface of the fixing plate, in which the wiping member wipes the ejection surface while moving relative to the liquid ejecting head in the first direction.

According to still another aspect of the present disclosure, there is provided a liquid ejecting apparatus including: the liquid ejecting head according to the above aspect; and a wiping member that wipes an ejection surface including the first nozzle plate, the second nozzle plate, and the surface of the fixing plate, in which the wiping member wipes the ejection surface while moving relative to the liquid ejecting head in a direction orthogonal to both the transport direction and the ejection direction.

According to still another aspect of the present disclosure, there is provided a liquid ejecting head unit including: a liquid ejecting head that ejects liquid to a medium moving in a transport direction, and includes a first head chip including a first nozzle plate formed with a plurality of nozzles for ejecting liquid in an ejection direction, a second head chip including a second nozzle plate formed with a plurality of nozzles for ejecting liquid in the ejection direction, and a fixing plate which has a first opening portion exposing at least a part of the first nozzle plate and a second opening portion exposing at least a part of the second nozzle plate, and to which the first head chip and the second head chip are fixed; a protection section protruding in the ejection direction from a surface of the fixing plate formed with the first opening portion; and a support member for supporting the liquid ejecting head, in which the protection section is detachably attached to the fixing plate by being interposed between the liquid ejecting head and the support member, and is arranged between the first head chip and the second head chip in the transport direction.

DESCRIPTION OF EXEMPLARY EMBODIMENTS

Figure 1:
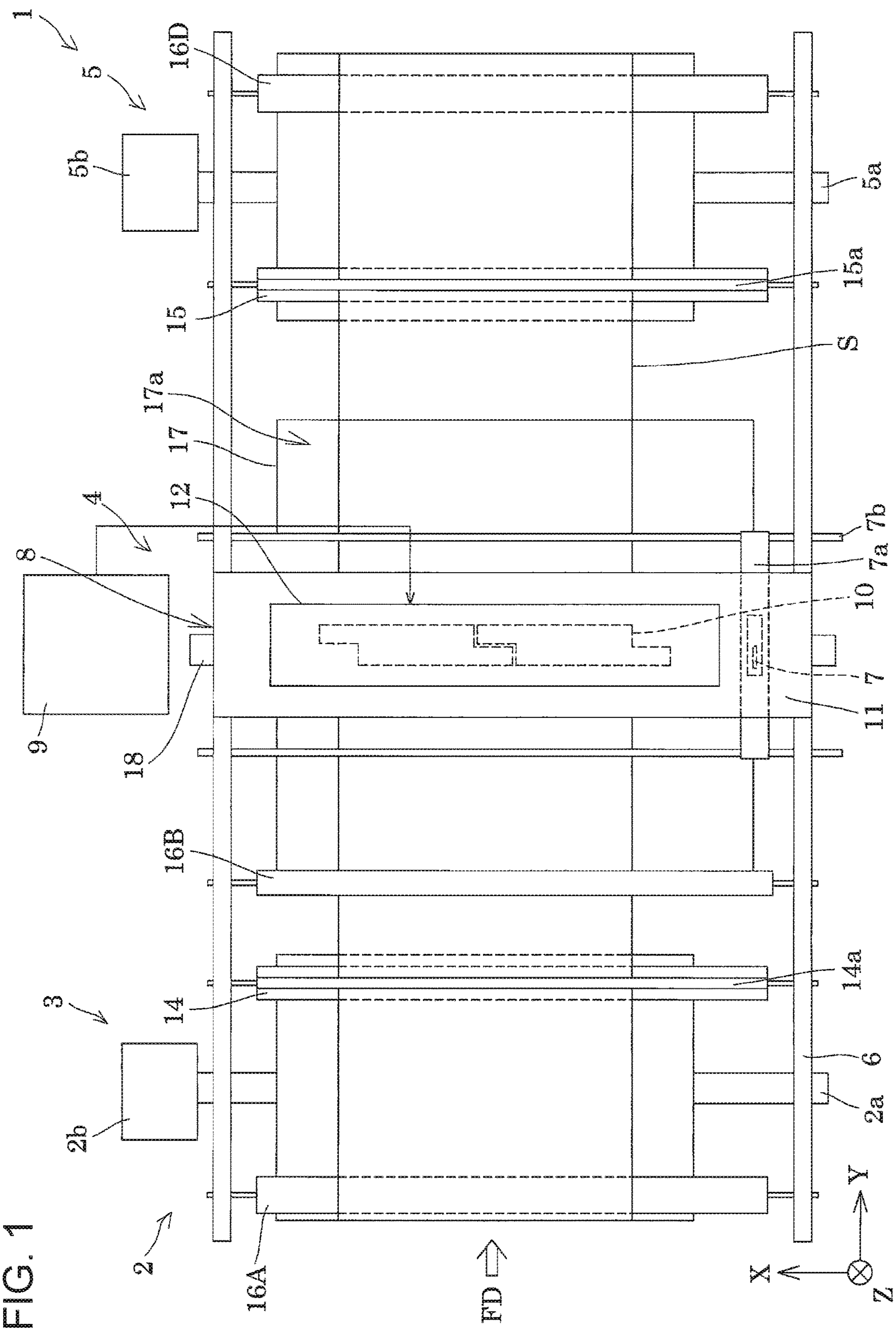
FIG. 1 is a top view illustrating a schematic configuration of a liquid ejecting apparatus according to Embodiment 1.

Hereinafter, the present disclosure will be described in detail based on embodiments. However, the following description shows one aspect of the present disclosure, and can be changed in any manner within the scope of the present disclosure. Those having the same reference numerals in each drawing indicate the same members, and the description thereof will be omitted as appropriate. In each of the drawings, X, Y, and Z represent three spatial axes orthogonal to each other. In the present specification, the directions along these axes are the X direction, the Y direction, and the Z direction. The direction in which the arrows in each drawing are oriented is described as the positive (+) direction, and the opposite direction of the arrows is described as the negative (−) direction. In addition, the three spatial axes that do not limit the positive direction and the negative direction will be described as the X-axis direction, the Y-axis direction, and the Z-axis direction. Further, the Z direction indicates a gravity direction and a direction opposite to the gravity direction, the +Z direction indicates a gravity direction, and the −Z direction indicates a direction opposite to the gravity direction.

Embodiment 1

Figure 2:
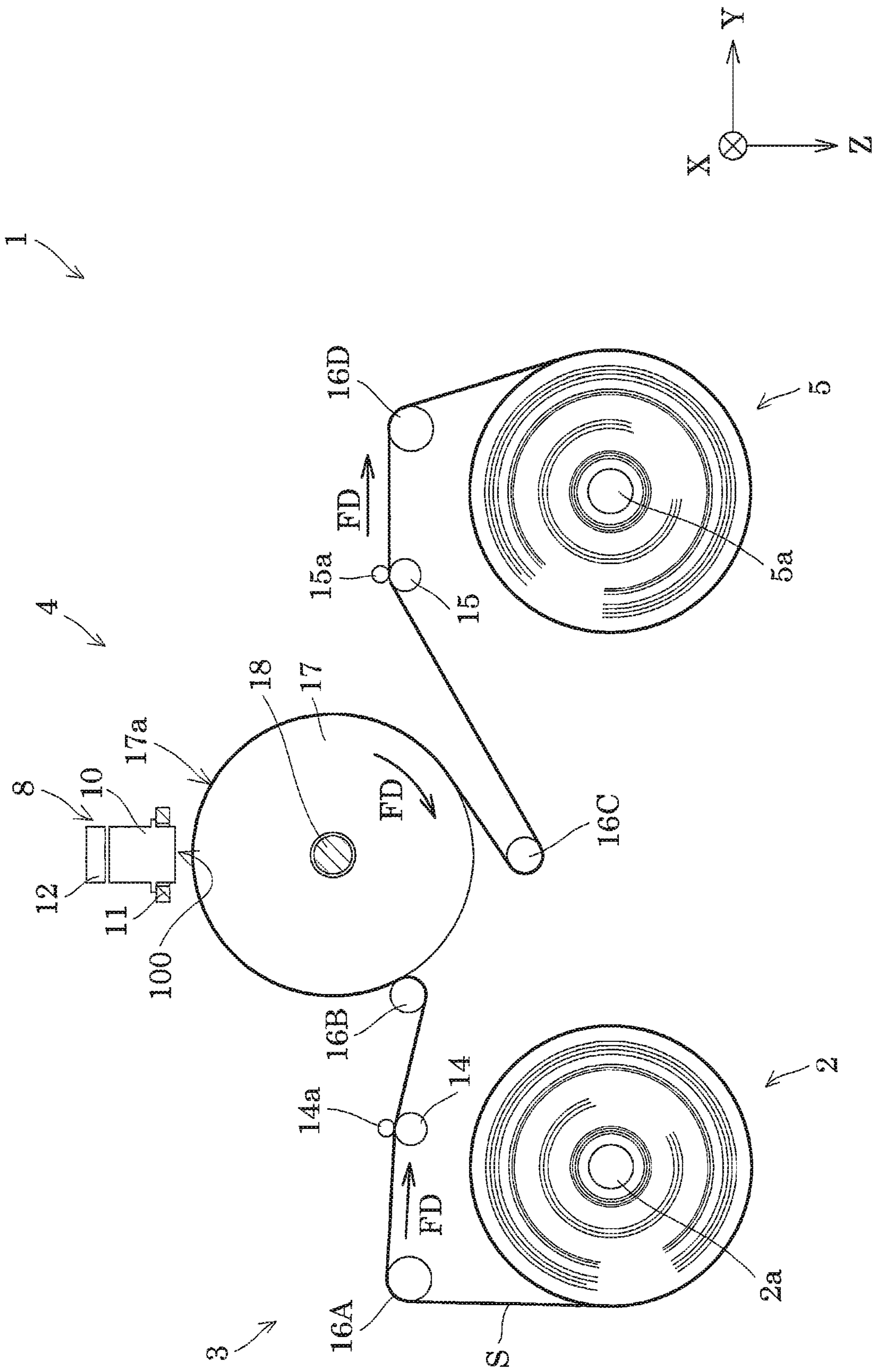
FIG. 2 is a side view illustrating a schematic configuration of the liquid ejecting apparatus according to Embodiment 1.

FIG. 1 is a top view illustrating a schematic configuration of a liquid ejecting apparatus 1 according to Embodiment 1 of the present disclosure. FIG. 2 is a side view illustrating a schematic configuration of the liquid ejecting apparatus 1.

As illustrated in the drawing, the liquid ejecting apparatus 1 is an ink jet printing apparatus that causes ink, which is a type of liquid, to be ejected and land on a printing medium S, and prints an image or the like based on an arrangement of dots formed on the medium S. As the medium S, any material such as a recording paper sheet, a resin film, or a cloth can be used.

Further, the liquid ejecting apparatus 1 of the present embodiment is a so-called line type printing apparatus that performs printing by causing the liquid to be ejected and land on the medium S from a liquid ejecting head 10 while transporting the medium S in a state where the liquid ejecting head 10 is fixed during the printing.

The liquid ejecting apparatus 1 includes a feeding section 2, a transport section 3, a printing section 4, a winding section 5, an apparatus main body 6, and a wiping member 7.

The feeding section 2 feeds out the elongated medium S. The feeding section 2 includes a feeding shaft 2*a* extending along the X axis. The feeding shaft 2*a* is supported to be rotatable by the apparatus main body 6 and is provided to be rotatable by being driven by a feeding motor 2*b*. A long medium S is rotatably supported on the feeding shaft 2*a* integrally with the feeding shaft 2*a* in a state where the long medium S is wound in a roll shape in advance. The medium S is wound around the feeding shaft 2*a* with the printing surface, which is the surface on which printing is performed, facing outward. The feeding shaft 2*a* rotates clockwise in FIG. 2 to feed the medium S.

The transport section 3 transports the medium S in a transport direction FD. The transport direction FD is a direction along a transport path of the medium S, and is a direction from the feeding section 2 toward the winding section 5. The transport section 3 includes a first driving roller 14 and a second driving roller 15 that transport the medium S, and a first driven roller 16A, a second driven roller 16B, a third driven roller 16C, and a fourth driven roller 16D that are driven and rotated with respect to the medium S to be transported. The first driving roller 14, the second driving roller 15, the first driven roller 16A, the second driven roller 16B, the third driven roller 16C, and the fourth driven roller 16D are rotatably supported by the apparatus main body 6.

In addition, the transport section 3 includes a first nip roller 14*a* that presses the medium S against the first driving roller 14, and a second nip roller 15*a* that presses the medium S against the second driving roller 15. By providing the first nip roller 14*a*, it becomes easy to secure a frictional force between the first driving roller 14 and the medium S. Further, by providing the second nip roller 15*a*, it becomes easy to secure a frictional force between the second driving roller 15 and the medium S. The first nip roller 14*a* and the second nip roller 15*a* are rotatably supported by the apparatus main body 6.

The transport section 3 includes a drum 17 that supports the back surface of the medium S on a side opposite to the printing surface. The drum 17 is provided to be rotatable around a rotation shaft 18 extending in the shaft direction. The drum 17 is an example of a "cylindrical member". In the present embodiment, the shaft direction of the rotation shaft 18 of the drum 17 is a direction parallel to the X axis. The rotation shaft 18 may be provided to be rotatable with respect to the apparatus main body, the rotation shaft 18 may be fixed to the apparatus main body 6 not to rotate, and the drum 17 may be provided to be rotatable with respect to the rotation shaft 18. In the present embodiment, the rotation shaft 18 is fixed to the apparatus main body 6 not to rotate, and the drum 17 is provided to be rotatable with respect to the rotation shaft 18. That is, the drum 17 has a cylindrical shape attached to the outer periphery of the rotation shaft 18. The transport direction FD on the drum 17 is the rotation direction of the drum 17, but the "transport direction" of the medium S with respect to the liquid ejecting head 10 and the liquid ejecting head unit 8 is the extending direction of a tangent line of a surface 17*a* of the drum 17 facing the ejection surface 100 of the liquid ejecting head 10. Further, the fact that the drum 17 is provided to be rotatable around the rotation shaft 18 means that the axis center on which the drum 17 rotates and the axis center of the rotation shaft 18 are the same. When the rotation shaft 18 is provided to be rotatable with respect to the apparatus main body 6, the drum 17 may be fixed to the rotation shaft 18, and the drum 17 and the rotation shaft 18 may be provided to be rotatable together. The medium S is wound around an outer peripheral surface of the drum 17 in a state where tension is applied, and is supported by the surface 17*a* of the outer periphery of the drum 17. The drum 17 may be driven and rotated with respect to the medium S to be transported, or may rotate with the drive of a transport motor (not illustrated) to transport the medium S.

The medium S fed out from the feeding section 2 is wound around the first driven roller 16A, the first driving roller 14, the second driven roller 16B, the drum 17, the third driven roller 16C, the second driving roller 15, and the fourth driven roller 16D in order and sent to the winding section 5. When the medium S is wound around the second driven roller 16B and the third driven roller 16C adjacent to the drum 17 in the transport direction FD to be folded back, an area supported by the drum 17 increases.

The winding section 5 includes a winding shaft 5*a* extending along the X axis. The winding shaft 5*a* is provided to be rotatable by being driven by a winding motor 5*b*. Further, the winding shaft 5*a* is supported to be rotatable by the apparatus main body 6. The medium S is passed through a transport path in advance, and a downstream end in the transport direction FD is wound around the winding shaft 5*a*. The winding shaft 5*a* rotates clockwise in FIG. 2 to wind the medium S. The medium S is wound around the winding shaft 5*a* with the printing surface facing outward.

The printing section 4 includes the liquid ejecting head unit 8 having a plurality of liquid ejecting heads 10 that eject ink, which is liquid, onto the medium S supported by the drum 17. In the present embodiment, one liquid ejecting head unit 8 is arranged with respect to the drum 17 in the −Z direction. That is, the liquid ejecting head 10 constituting the liquid ejecting head unit 8 is arranged such that the ejection direction of the ink coincides with the +Z direction and the ejection surface 100 for ejecting the ink is a direction along the XY plane which is a horizontal plane. It is needless to say that the number of liquid ejecting head units 8 is not limited to this, and the plurality of (two or more) liquid ejecting head units 8 may be provided. When the plurality of liquid ejecting head units 8 are provided, the plurality of liquid ejecting head units 8 are arranged along the transport direction FD with respect to the drum 17, but the ejection surface 100 of each liquid ejecting head unit 8 may be arranged such that the inclination with respect to the XY plane, which is a horizontal plane, becomes different. Further, one liquid ejecting head unit 8 may eject one type of ink or may eject a plurality of types of ink.

Further, one liquid ejecting head unit 8 has two liquid ejecting heads 10 in the present embodiment. It is needless to say that the number of liquid ejecting heads 10 provided in one liquid ejecting head unit 8 is not particularly limited to this, and may be one or a plural (three or more).

Such a liquid ejecting head unit 8 is a so-called line head capable of simultaneously ejecting ink over a width along the X axis of the medium S.

Further, the printing section 4 includes a liquid storage section 9 that supplies ink to the liquid ejecting head unit 8. The liquid storage section 9 individually stores a plurality of types, for example, a plurality of colors of ink ejected from the liquid ejecting head unit 8. Examples of the liquid storage sections 9 include a cartridge that can be attached to and detached from the liquid ejecting apparatus 1, a bag-like ink pack formed of a flexible film, an ink tank that can be refilled with ink, and the like. Further, although not particularly illustrated, a plurality of liquid storage sections 9 are provided corresponding to a plurality of types of inks having different colors and types. In the present embodiment, a plurality of liquid storage sections 9 are provided, but in FIG. 1, the plurality of liquid storage sections 9 are collectively illustrated as one.

The wiping member 7 wipes the ejection surface 100 of the liquid ejecting head 10. The wiping member 7 is held by a holding section 7*a* at an end portion in the +Z direction such that an end portion in the −Z direction becomes a free end. The holding section 7*a* is provided to be able to reciprocate in the shaft direction of the shaft portion 7*b* provided in the apparatus main body 6. The shaft portion 7*b* is arranged along the X-axis direction, and the holding section 7*a* pivotally supported by the shaft portion 7*b* makes sliding contact with the ejection surface 100 while moving the wiping member 7 in the X-axis direction with respect to the liquid ejecting head 10. In the present embodiment, the wiping member 7 is moved in the X-axis direction, but the present disclosure is not particularly limited thereto. By moving the liquid ejecting head 10 in the X-axis direction, the ejection surface 100 may be wiped by the wiping member 7. That is, the wiping member 7 and the liquid ejecting head 10 may move relative to each other in the X-axis direction. The width of the wiping member 7 will be described in detail later.

Figure 3:
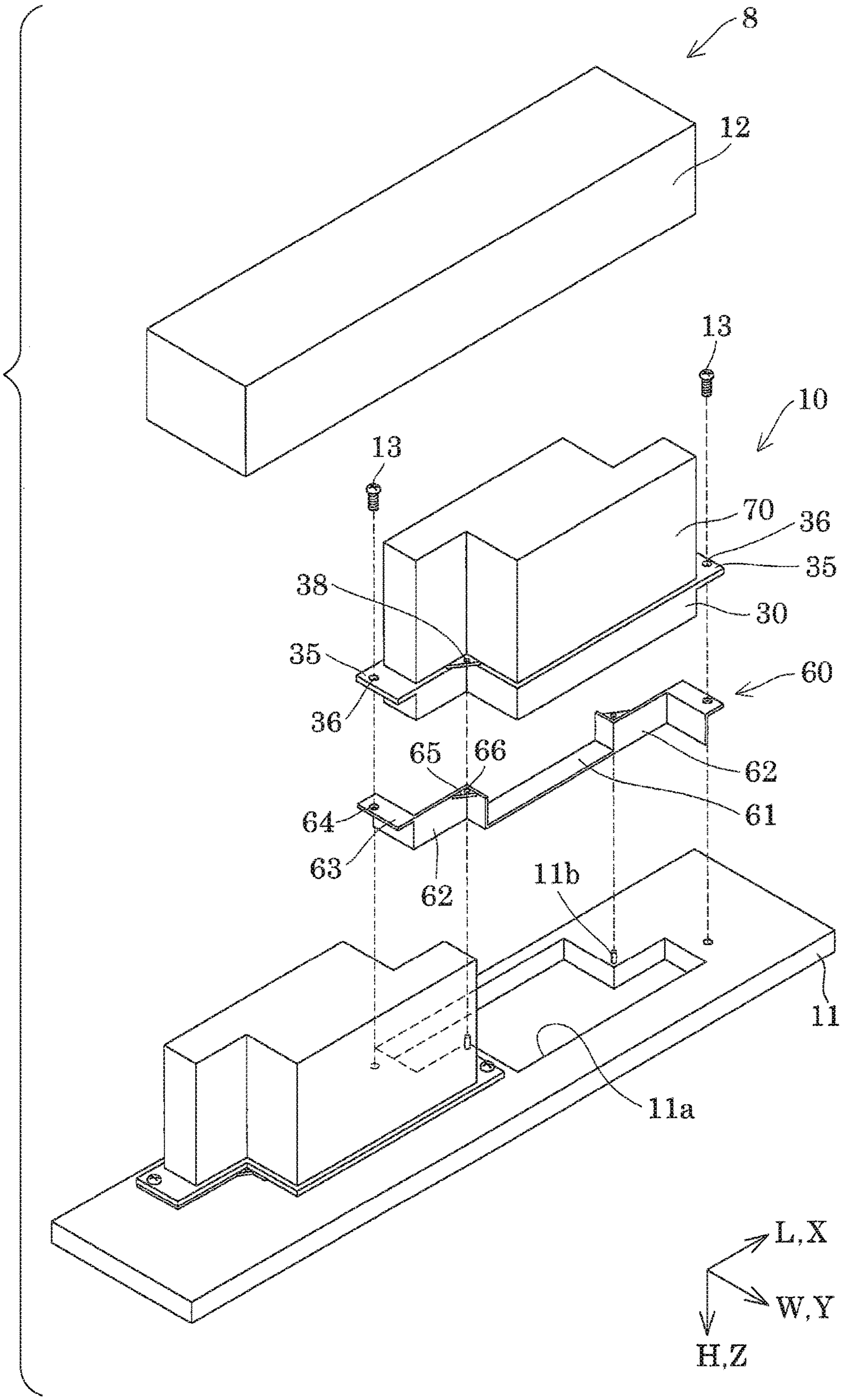
FIG. 3 is an exploded perspective view of a liquid ejecting head unit according to Embodiment 1.
Figure 4:
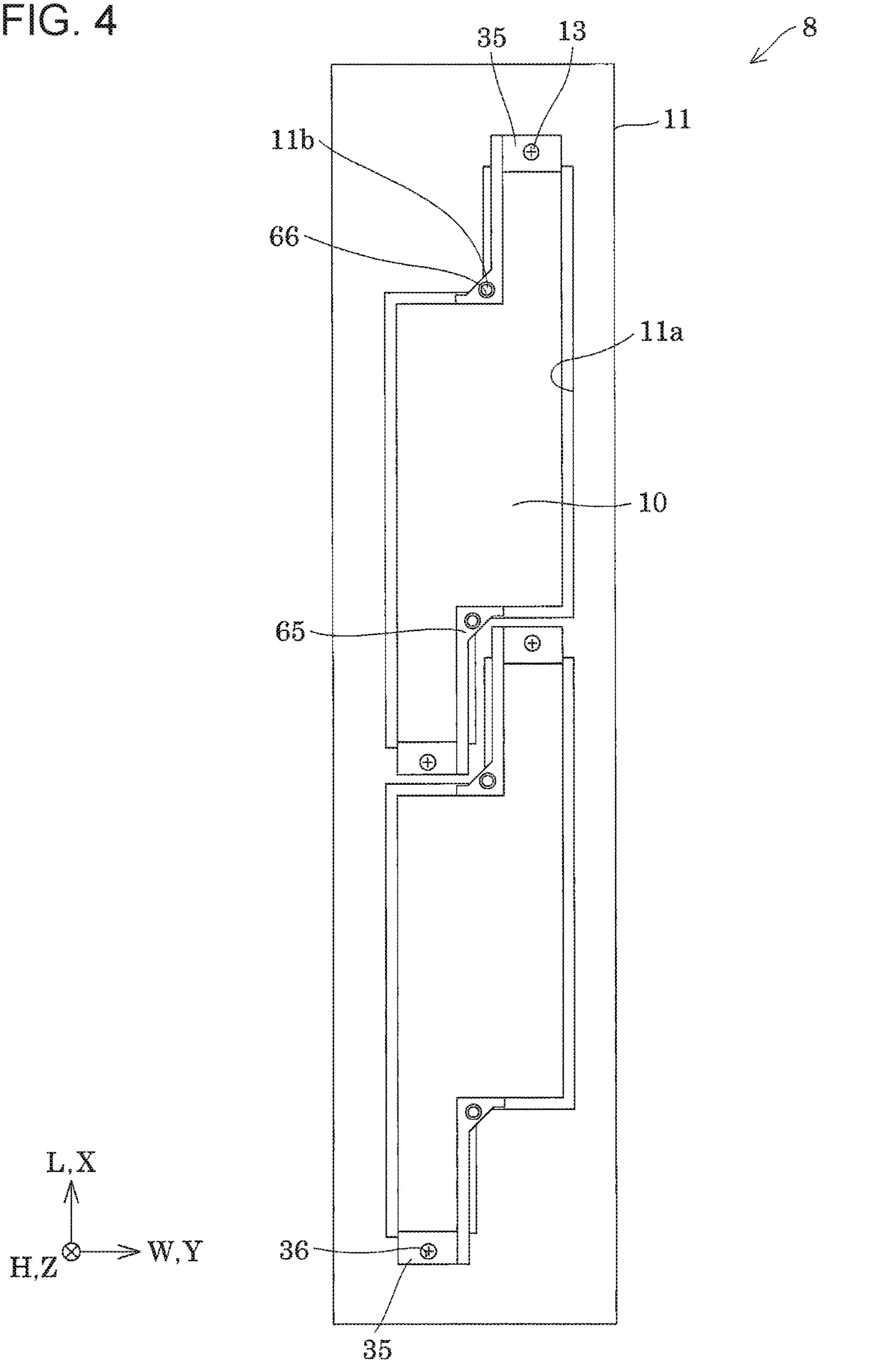
FIG. 4 is a top view of a liquid ejecting head and a support member according to Embodiment 1.
Figure 5:
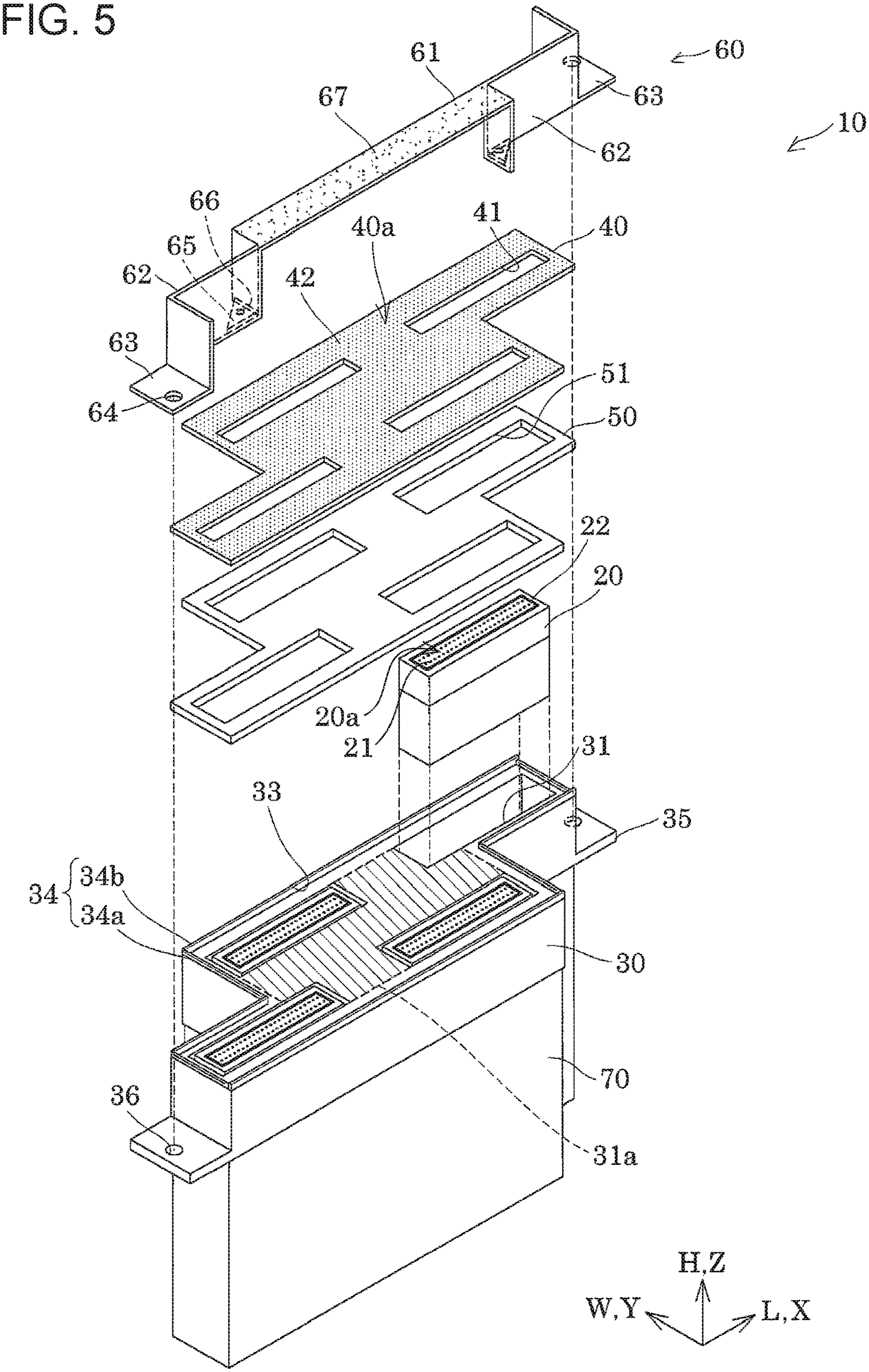
FIG. 5 is an exploded perspective view of the liquid ejecting head according to Embodiment 1.
Figure 6:
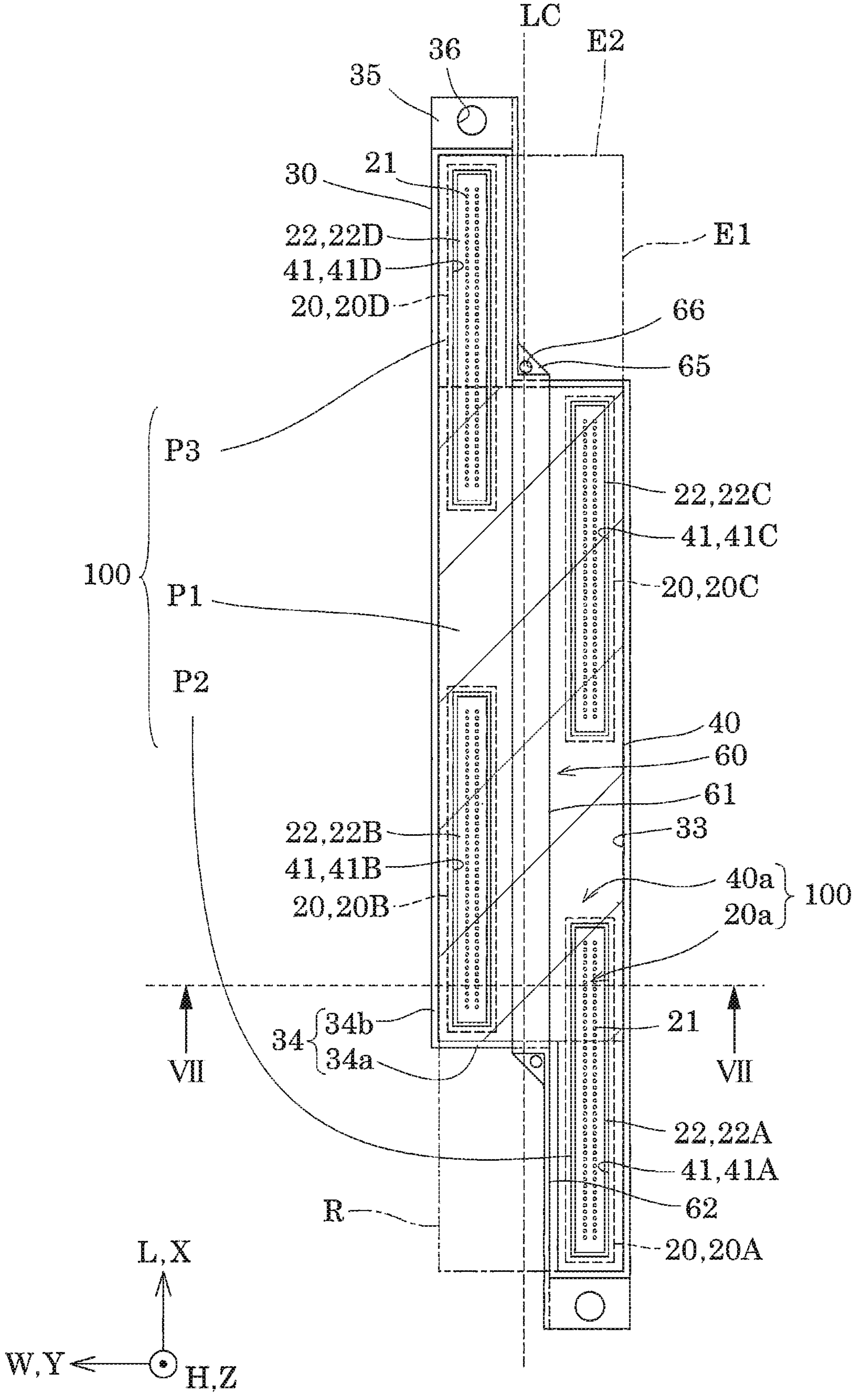
FIG. 6 is a bottom view of the liquid ejecting head according to Embodiment 1.
Figure 7:
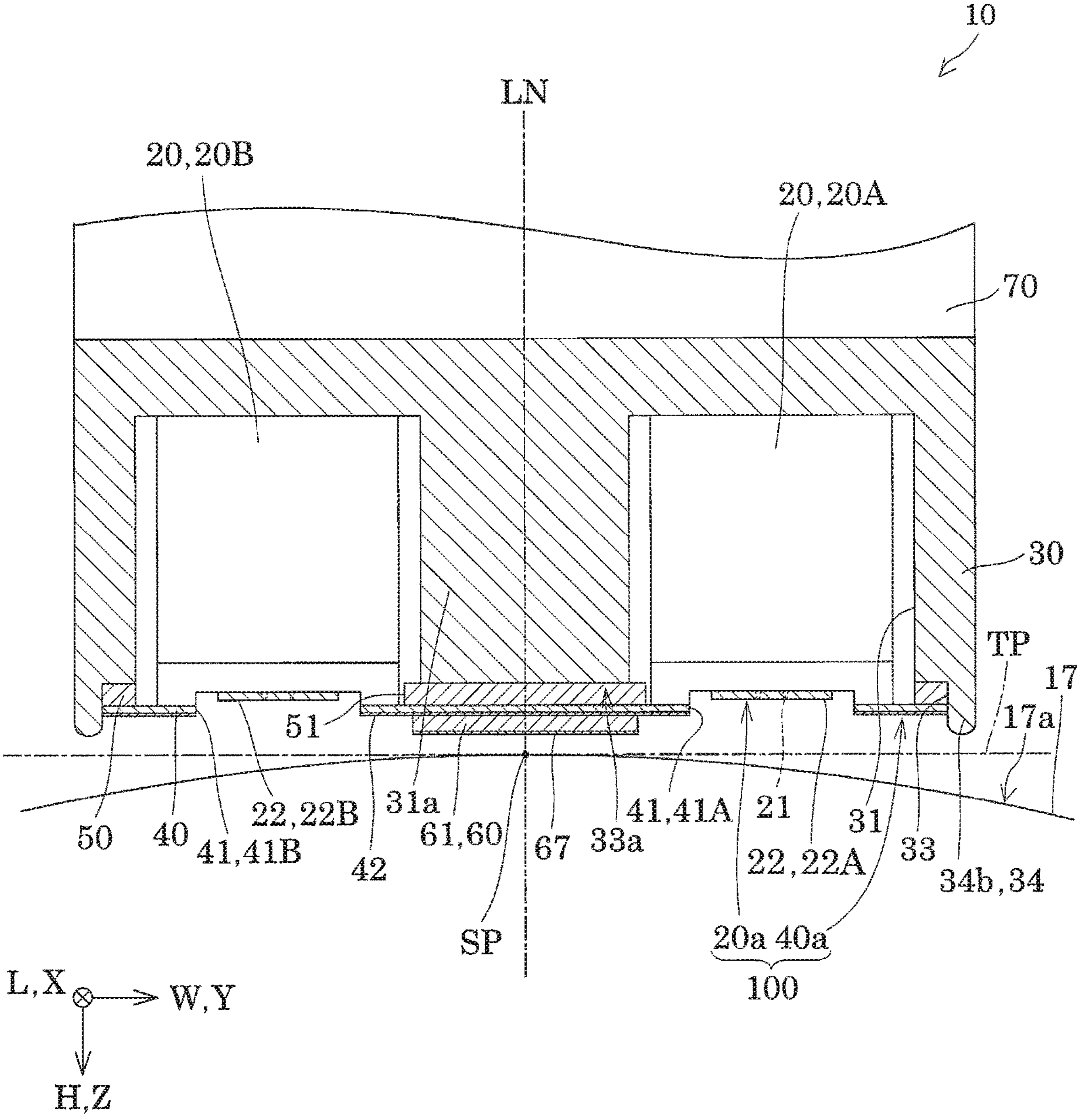
FIG. 7 is a sectional view of a main portion of the liquid ejecting head and the drum according to Embodiment 1.

FIG. 3 is an exploded perspective view of the liquid ejecting head unit 8. FIG. 4 is a plan view of the liquid ejecting head 10 and the support member 11 when viewed in the +H direction. FIG. 5 is an exploded perspective view of the liquid ejecting head 10 when viewed in the −H direction. FIG. 6 is a bottom view of the liquid ejecting head 10 when viewed in the −H direction. FIG. 7 is a sectional view of the liquid ejecting head 10 and the drum 17 when viewed in the +L direction.

Here, in the liquid ejecting head 10 of the present embodiment, the longitudinal direction is the L-axis direction, and the lateral direction is the W-axis direction. The L-axis direction and the W-axis direction are directions orthogonal to the +H direction, which is the “ejection direction” in which ink is ejected from a nozzle 21, and are directions orthogonal to each other. That is, the L-axis direction, the W-axis direction, and the +H direction are directions orthogonal to each other. In addition, the direction in which the arrows are oriented is described as the positive (+) direction, and the opposite direction of the arrows is described as the negative (−) direction. The L-axis direction is used when the +L direction and the −L direction are not distinguished, the W-axis direction is used when the +W direction and the −W direction are not distinguished, and the H-axis direction is used when the +H direction and the −H direction are not distinguished. In the present embodiment, the “first direction” is the +L direction, and the “second direction” is the +W direction.

The liquid ejecting head 10 of the present embodiment is positioned in the −Z direction of the drum 17 in a state where the ejection surface 100 is parallel to the surface 17*a* of the drum 17, the L-axis direction coincides with the X-axis direction, the W-axis direction coincides with the Y-axis direction, and the H-axis direction coincides with the Z-axis direction. The fact that the ejection surface 100 is parallel to the surface 17*a* of the drum 17 means that the extending direction of the tangent line of the surface 17*a*, which is the outer peripheral surface of the drum 17, and the ejection surface 100 are parallel to each other. In addition, each direction of the liquid ejecting head unit 8 will be described based on the direction of the liquid ejecting head 10, that is, the L-axis direction, the W-axis direction, and the Z-axis direction.

As illustrated in FIGS. 3 and 4, the liquid ejecting head unit 8 includes the plurality of liquid ejecting heads 10, the support member 11 that holds the plurality of liquid ejecting heads 10, and a supply member 12 that supplies ink to the plurality of liquid ejecting heads 10. In the present embodiment, one liquid ejecting head unit 8 has two liquid ejecting heads 10. The number of liquid ejecting heads 10 held by the liquid ejecting head unit 8 is not particularly limited to this, and may be one or three or more.

The support member 11 is formed of a plate-shaped member and is supported by the apparatus main body 6. The support member 11 is provided with a support hole 11*a* for holding each of the liquid ejecting heads 10. In the present embodiment, the support holes 11*a* are provided independently for each liquid ejecting head 10. It is needless to say that the support holes 11*a* may be continuously provided over the plurality of liquid ejecting heads 10.

The liquid ejecting head 10 is held in the support hole 11*a* of the support member 11 in a state where the ejection surface 100 protrudes from the surface of the support member 11 facing the +H direction. That is, the liquid ejecting head 10 is inserted into the support hole 11*a*, and a flange section 35 of the liquid ejecting head 10, which will be described later, is supported by the peripheral edge portion of the support hole 11*a*. Each of the liquid ejecting heads 10 is provided with first fixing holes 36 at both ends in the +X direction and the −X direction. The liquid ejecting head 10 is detachably fixed to the support member 11 by inserting a fixing screw 13 through the first fixing hole 36 and screwing the fixing screw 13 into the support member 11.

Further, the support member 11 is provided to be relatively movable in the Z-axis direction with respect to the drum 17 by an elevating mechanism (not illustrated). In a state where the elevating mechanism moves the support member 11 with respect to the drum 17 in the −Z direction, the ejection surface 100 of the liquid ejecting head 10 is wiped by the wiping member 7.

Further, a plurality of liquid ejecting heads 10 held by the support member 11 are provided in the L-axis direction, and in the present embodiment, two are provided. Details of the liquid ejecting head 10 will be described later.

The supply member 12 supplies the ink supplied from the liquid storage section 9 to the plurality of liquid ejecting heads 10. That is, on the inside (not illustrated) of the supply member 12, a flow path for supplying the ink supplied from the liquid storage section 9 to the liquid ejecting head 10 is provided. This flow path may be a branch flow path that distributes ink to the plurality of liquid ejecting heads 10. In addition, a filter or the like for capturing dust or air bubbles contained in the ink, heating means such as a heater for heating the ink, or the like may be provided in the middle of the flow path of the supply member 12. In a mode in which the supply member 12 includes the liquid storage section 9, for example, the liquid storage section 9 such as a cartridge may be mounted on the −Z direction side of the supply member 12. Further, inside the supply member 12 (not illustrated), a discharge path for discharging ink that was not ejected from the liquid ejecting head 10 to the outside of the liquid ejecting head 10 may be provided.

As illustrated in FIGS. 5 to 8, the liquid ejecting head 10 includes a plurality of head chips 20 that eject ink, a holder 30 that holds the plurality of head chips 20, a fixing plate 40 that fixes the plurality of head chips 20, a reinforcing plate 50 that reinforces the fixing plate 40, a protection member 60 that protects the fixing plate 40, and a flow path member 70. In the present embodiment, four head chips 20 is held in one fixing plate 40.

The head chip 20 has a nozzle plate 22 provided with the nozzle 21 for ejecting ink. The nozzle plate 22 is provided with a nozzle array in which the nozzles 21 are arranged in parallel in the L-axis direction. Further, the nozzle plate 22 is provided with a plurality of nozzle arrays, in which the nozzles 21 are arranged in parallel in the L-axis direction, in the W-axis direction, and in the present embodiment, two are provided.

Inside the head chip 20 (not illustrated), a flow path communicating with the nozzle 21 and pressure generation means for causing a pressure change in the ink in the flow path are provided. As the pressure generation means, for example, the one that changes the volume of the flow path by deformation of the piezoelectric actuator having a piezoelectric material exhibiting an electromechanical conversion function, causes the pressure change in the ink in the flow path, and discharges the ink droplets from the nozzle 21 can be used. In addition, as another pressure generation means, for example, the one in which a heat generating element is arranged in the flow path and ink droplets are discharged from the nozzle 21 by a bubble generated by the heat generated by the heat generating element can be used. Furthermore, as another pressure generation means, for example, a so-called electrostatic actuator or the like, which generates an electrostatic force between the vibrating plate and the electrode, deforms the vibrating plate by the electrostatic force, and discharges ink droplets from the nozzle 21 can be used. The surface of the nozzle plate 22, on which the nozzle 21 of the head chip 20 is opened, facing the medium S side is a nozzle surface 20*a*. That is, the ejection surface 100 of the liquid ejecting head 10 includes the nozzle surface 20*a* formed with the nozzle 21.

Further, the head chip 20 has a rectangular shape in which the L-axis direction is the longitudinal direction and the W-axis direction is the lateral direction when viewed in the +H direction. That is, the head chip 20 is fixed to the fixing plate 40 such that the longitudinal direction coincides with the L-axis direction and the lateral direction coincides with the W-axis direction.

The holder 30 is made of a metal material, a resin material, or the like. An accommodation section 31 accommodating the plurality of head chips 20 is provided on a surface of the holder 30 facing the +Z direction. The accommodation section 31 has a concave shape that opens in the +Z direction, and accommodates the plurality of head chips 20 fixed by the fixing plate 40. Further, the opening of the accommodation section 31 is covered with the fixing plate 40. In other words, the head chip 20 is accommodated on the inside of a space formed by the accommodation section 31 and the fixing plate 40. The accommodation section 31 may be provided independently for each head chip 20, or may be continuously provided over the plurality of head chips 20. In the present embodiment, an independent accommodation section 31 is provided for each head chip 20. That is, the holder 30 has a partition wall 31*a* for partitioning the accommodation sections 31 accommodating the head chips 20. Here, the partition wall 31*a* means a part of the holder 30 between the accommodation section 31 and the accommodation section 31 arranged in the L-axis direction and between the accommodation section 31 and the accommodation sections 31 arranged in the W-axis direction, and a region hatched in FIG. 5.

In the holder 30, four head chips 20 are arranged in a staggered manner in the L-axis direction. Here, arranging the head chips 20 in a staggered manner in the L-axis direction means two arrays of head chips 20 arranged side by side in the L-axis direction are arranged in the W-axis direction and arrays adjacent to each other in the W-axis direction are arranged to be shifted from each other in the L-axis direction. By arranging the head chips 20 in a staggered pattern along the L-axis direction in this manner, the nozzles 21 of the two head chips 20 adjacent to each other in the L-axis direction are partially overlapped in the L-axis direction, and continuous arrays of nozzles 21 in the L-axis direction can be formed.

In the present embodiment, the four head chips 20 are referred to as a first head chip 20A, a second head chip 20B, a third head chip 20C, and a fourth head chip 20D, respectively, and each nozzle plate 22 is referred to as a first nozzle plate 22A, a second nozzle plate 22B, a third nozzle plate 22C, and a fourth nozzle plate 22D. Hereinafter, when the first head chip 20A, the second head chip 20B, the third head chip 20C, and the fourth head chip are not distinguished, the head chips are referred to as the head chip 20, and when the first nozzle plate 22A, the second nozzle plate 22B, the third nozzle plate 22C, and the fourth nozzle plate 22D are not distinguished, the nozzle plates are referred to as the nozzle plate 22.

The first head chip 20A and the second head chip are arranged at positions shifted from each other in the L-axis direction and the W-axis direction, and are arranged at positions where some of the first head chip 20A and the second head chip 20B overlap each other when viewed in the W-axis direction. Further, the second head chip 20B and the third head chip 20C are arranged at positions shifted from each other in the L-axis direction and the W-axis direction, and are arranged at positions where some of the second head chip 20B and the third head chip 20C overlap each other when viewed in the W-axis direction. Further, the third head chip 20C and the fourth head chip 20D are arranged at positions shifted from each other in the L-axis direction and the W-axis direction, and are arranged at positions where some of the third head chip 20C and the fourth head chip 20D are partially different from each other when viewed in the W-axis direction.

That is, the first head chip 20A and the third head chip 20C are arranged side by side in the L-axis direction, and the second head chip 20B and the fourth head chip 20D are arranged side by side in the L-axis direction.

In addition, a recess portion 33 having a recessed shape to which the reinforcing plate 50 and the fixing plate 40 are fixed is provided on the surface facing the +H direction provided with the accommodation section 31 of the holder 30. That is, the outer peripheral edge portion of the surface of the holder 30 facing the +H direction is an outer peripheral rib 34 protruding in the +H direction side, and the recess portion 33 is formed by the outer peripheral rib 34 protruding in the +H direction. The reinforcing plate 50 and the fixing plate 40 are sequentially laminated on the bottom surface of the recess portion 33. In other words, the holder 30 has an outer peripheral wall surrounding the first head chip 20A, the second head chip 20B, the third head chip 20C, and the fourth head chip 20D when viewed in the +H direction. At the distal ends of the outer peripheral wall, the bottom surface of the recess portion 33 is a "fixing region" to which the fixing plate 40 is fixed, and at the distal end of the outer peripheral wall, the outer peripheral rib 34 for forming the recess portion 33 is provided on the outside of the fixing region. Note that fixing the fixing plate 40 to the fixing region which is the bottom surface of the recess portion 33 includes directly fixing the fixing plate 40 to the bottom surface of the recess portion 33. Further, fixing the fixing plate 40 to the fixing region which is the bottom surface of the recess portion 33 means that the fixing plate 40 is fixed to the fixing region which is the bottom surface of the recess portion 33 via another member, in the present embodiment, the reinforcing plate 50. That is, in the present embodiment, the fixing plate 40 is fixed to the bottom surface of the recess portion 33 via the reinforcing plate 50, but the fixing plate 40 may be directly fixed to the bottom surface of the recess portion 33 without providing the reinforcing plate 50. Further, the method of bonding the holder 30 to the reinforcing plate 50 and the fixing plate 40 is not particularly limited, and for example, adhesion via an adhesive, welding by heat or ultrasonic waves, or the like can be used.

Figure 8:
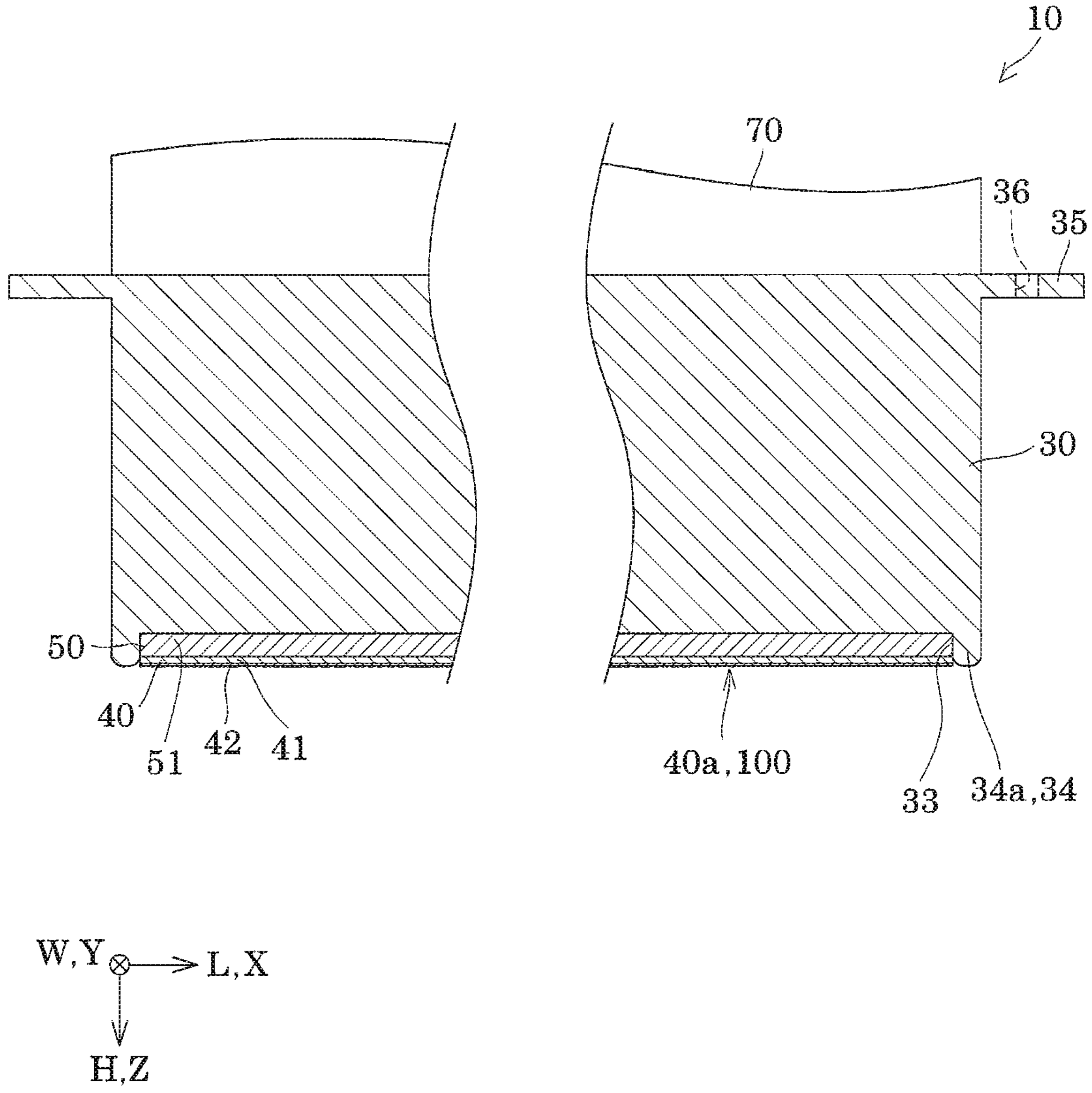
FIG. 8 is a sectional view of a main portion of the liquid ejecting head according to Embodiment 1.

In the outer peripheral rib 34, first outer peripheral ribs 34*a* on two sides provided in the direction along the Y-axis direction, which is the direction of relative movement between the medium S and the liquid ejecting head 10, are provided not to protrude in the +H direction from the fixing plate 40 fixed to the recess portion 33, as illustrated in FIG. 8. That is, a surface of the fixing plate 40 facing at least the +H direction is provided to protrude in the +H direction from the first outer peripheral rib 34*a*. Further, as illustrated in FIG. 6, in the outer peripheral rib 34, the distal end in the +H direction of the second outer peripheral ribs 34*b* on two sides provided in the L-axis direction (which coincides with the X-axis direction), which is a direction intersecting both the W-axis direction, which is the relative movement direction of the medium S, and the +H direction, which is the ink ejection direction, is provided to protrude in the +H direction from a surface 40*a* of the fixing plate 40 fixed to the recess portion 33 as illustrated in FIG. 7. That is, the second outer peripheral rib 34*b* of the present embodiment corresponds to the "outer peripheral rib" described in the scope of the patent claim.

As the second outer peripheral rib 34*b* protrudes from the fixing plate 40 in the +H direction in this manner, when the medium S and the liquid ejecting head 10 move relative to each other, that is, when the medium S is transported, it is possible to suppress the deformation and peeling of the fixing plate 40 due to the contact of the medium S with the side surface of the fixing plate 40. Further, by preventing the first outer peripheral rib 34*a* from protruding from the fixing plate 40, a part of the protection member 60, which will be described in detail later, can extend outward from the surface of the fixing plate 40 facing the +H direction to the outside of the first outer peripheral rib 34*a*, and it is possible to suppress the wiping member 7 from coming into contact with the first outer peripheral rib 34*a* when wiping the ejection surface 100, thereby suppressing wiping failures such as wiping residues and generation of droplets. It is needless to say that, as the first outer peripheral rib 34*a* protrudes from the fixing plate 40 in the +H direction, the first outer peripheral rib 34*a* and the second outer peripheral rib 34*b* may be used as the "outer peripheral rib" within the scope of the patent claim.

In addition, a pair of flange sections 35 protruding respectively in the +L direction and the −L direction are provided on the +H direction side of the holder 30. The flange section 35 is provided with the first fixing hole 36 through which the fixing screw 13 is inserted to penetrate in the H-axis direction.

The fixing plate 40 is configured of a plate-shaped member formed of a metal material or the like. The fixing plate 40 of the present embodiment is made of stainless steel. Further, the fixing plate 40 is provided with an opening portion 41 that exposes at least a part of the nozzle surface 20*a* of the head chip 20. In the present embodiment, the opening portions 41 are provided independently for each head chip 20. In the present embodiment, the fixing plate 40 is fixed to the surface of the head chip 20 facing the +H direction at the peripheral edge portion of the opening portion 41, and the entire surface of the nozzle plate 22 facing the +H direction is exposed. That is, when the opening portion 41 exposes the entire surface of the nozzle plate 22, a part of the surface of the head chip 20 facing the +H direction, which is different from the nozzle plate 22, is fixed to the fixing plate 40. It is needless to say that the opening portion 41 may partially expose the region of the nozzle plate 22 formed with the nozzle 21, and the outer peripheral part of the nozzle surface 20*a* may be fixed to the fixing plate 40. In the present embodiment, the opening portions 41 corresponding to each of the first head chip 20A, the second head chip 20B, the third head chip 20C, and the fourth head chip 20D are referred to as a first opening portion 41A, a second opening portion 41B, a third opening portion 41C, and a fourth opening portion 41D. Hereinafter, when the first opening portion 41A, the second opening portion 41B, the third opening portion 41C, and the fourth opening portion 41D are not distinguished, the opening portions are referred to as the opening portion 41.

The fixing plate 40 is fixed in the recess portion 33 of the holder 30 via the reinforcing plate 50 to close the opening of the accommodation section 31 of the holder 30.

Further, the surface 40*a* of the fixing plate 40 facing the +H direction is included in the ejection surface 100 of the liquid ejecting head 10. That is, the ejection surface 100 of the liquid ejecting head 10 includes the nozzle surface 20*a* of the nozzle plate 22 and the surface 40*a* of the fixing plate 40.

It is preferable that the reinforcing plate 50 be made of a material having a higher strength than that of the fixing plate 40. In the present embodiment, as the reinforcing plate 50, a plate-shaped member made of the same material as the fixing plate 40 and thicker in the H-axis direction than the fixing plate 40 is used.

Further, the reinforcing plate 50 is provided with a communication opening portion 51 having an inner diameter greater than the outer periphery of the head chip 20 penetrating in the H-axis direction, corresponding to the head chip 20 bonded to the fixing plate 40. The head chip 20 inserted into the communication opening portion 51 of the reinforcing plate 50 is bonded to a surface of the fixing plate 40 facing the −H direction.

Further, as illustrated in FIGS. 7 and 8, a liquid repellent film 42 is provided on the surface of the fixing plate 40 facing the +H direction. The liquid repellent film 42 has liquid repellency (water repellency) with respect to ink, and for example, a metal film containing a fluorine-based polymer, a molecular film of a metal alkoxide having liquid repellency, or the like can be used. The liquid repellent film 42 is not provided on the surface of the fixing plate 40 facing the −H direction. By not providing the liquid repellent film 42 on the surface of the fixing plate 40 facing the −H direction in this manner, the fixing plate 40 can be satisfactorily bonded to the head chip 20 and the reinforcing plate 50.

As illustrated in FIGS. 5 to 8, the protection member 60 includes a protection section 61 provided on the surface 40*a* side of the fixing plate 40 facing the +H direction and provided along the XY plane, a side wall portion 62 extending from each of both end portions of the protection section in the L-axis direction and provided along the side surface of the holder 30, and a fixing section 63 extending from the side wall portion 62 and provided along the XY plane fixed to the support member 11 together with the holder 30.

The protection section 61 is composed of a plate-shaped member provided along the XY plane. The protection section 61 is provided to protrude in the +H direction from the surface 40*a* facing the +H direction formed with the first opening portion 41A of the fixing plate 40, and brings the medium S into contact with the protection section 61 to reduce the contact of the medium S with the fixing plate 40. The protection section 61 of the present embodiment is provided on the surface 40*a* of the fixing plate 40 facing the +H direction. Here, the fact that the protection section 61 is provided on the surface 40*a* of the fixing plate 40 also includes that, a state where the protection section 61 is in contact with the surface 40*a* of the fixing plate 40, and a state where a space or another member is interposed between the protection section 61 and the surface 40*a*, that is, a so-called arrangement above the surface 40*a*. However, the protection section 61 is preferably arranged in contact with the surface 40*a* of the fixing plate 40. By bringing the protection section 61 into contact with the surface 40*a* in this manner, the protrusion amount of the protection section 61 protruding from the surface 40*a* of the fixing plate 40 in the +H direction is reduced, and the gap between the ejection surface 100 of the liquid ejecting head 10 and the medium S can be narrowed. Further, when a gap is provided between the protection section 61 and the surface 40*a*, there is a concern that ink enters and the entered ink falls onto the medium S at an unexpected timing. By bringing the protection section 61 into contact with the surface 40*a*, it is possible to eliminate the gap at which the ink enters and suppress falling of the ink onto the medium S.

The protection section 61 is arranged between the first head chip 20A and the second head chip 20B in the W-axis direction. Since the W-axis direction is the transport direction FD of the medium S and coincides with the +Y direction, the protection section 61 is arranged between the first head chip 20A and the second head chip 20B in the +Y direction, which is the transport direction of the medium S. Incidentally, the transport direction FD of the medium S is the rotation direction of the drum 17, and actually is the extending direction of the tangent line of the surface 17*a* of the drum 17 facing the ejection surface 100. The fact that the protection section 61 is arranged between the first head chip 20A and the second head chip 20B in the W-axis direction means that, when the protection section 61 is arranged between the first nozzle plate 22A and the second nozzle plate 22B in the W-axis direction, the protection section 61 does not overlap the first nozzle plate 22A and the second nozzle plate 22B when viewed in the W-axis direction. It is needless to say that, in the protection section 61, it is preferable that the protection section 61 overlap the first nozzle plate 22A and the second nozzle plate 22B when viewed in the W-axis direction. In this manner, by arranging the protection section 61 at a position overlapping the first nozzle plate 22A and the second nozzle plate 22B when viewed in the W-axis direction, the region between the first nozzle plate 22A and the second nozzle plate 22B of the fixing plate 40 can be protected.

Further, the fact that the protection section 61 is arranged between the first head chip 20A and the second head chip 20B in the W-axis direction means that, when the first head chip 20A and the second head chip 20B are arranged in the W-axis direction, the protection section 61 does not overlap the first head chip 20A or the second head chip 20B when viewed in the W-axis direction. It is needless to say that, since the protection section 61 is for suppressing the medium S from coming into contact with the fixing plate 40, the protection section 61 is arranged at a position overlapping both the first head chip 20A and the second head chip 20B when viewed in the W-axis direction, and accordingly, it is possible to suppress the contact of the medium S with the nozzle plate 22.

Further, the protection section 61 is arranged between the second head chip 20B and the third head chip 20C in the W-axis direction. Further, the protection section 61 is arranged between the third head chip 20C and the fourth head chip 20D in the W-axis direction. In the present embodiment, the protection section 61 is provided continuously in the L-axis direction between the first opening portion 41A and the second opening portion 41B, between the second opening portion 41B and the third opening portion 41C, and between the third opening portion. 41C and the fourth opening portion 41D in the W-axis direction.

Further, the protection section 61 is preferably arranged at the center position of the fixing plate 40 in the +W direction. The fact that the protection section 61 is arranged at the center position of the fixing plate 40 in the +W direction means that the protection section 61 is arranged at a position overlapping the center position of the fixing plate 40 in the W-axis direction when viewed in the +H direction. It is preferable that the center position of the protection section 61 in the W-axis direction and the center position of the fixing plate 40 in the W-axis direction coincide with each other.

Further, it is preferable that the protection section 61 be arranged at the center position between the first head chip 20A and the second head chip 20B in the +W direction. The fact that the protection section 61 is arranged at the center position between the first head chip 20A and the second head chip 20B in the +W direction means that the protection section 61 is arranged at a position overlapping the center position between the first head chip 20A and the second head chip 20B when viewed in the +H direction. It is preferable that the center position of the protection section 61 in the W-axis direction and the center position between the first head chip 20A and the second head chip 20B coincide with each other. Further, in the present embodiment, the center position of the fixing plate 40 and the center position between the first head chip 20A and the second head chip 20B are the same in the +W direction. It is needless to say that the center position of the fixing plate 40 and the center position between the first head chip 20A and the second head chip 20B may be different from each other in the +W direction. Since the protection section 61 is for suppressing the deformation or breakage of the fixing plate 40 due to collision with the medium jam or the drum 17, it is preferable that the protection section 61 be provided at a position where the gap with the drum 17 is the narrowest. In general, regardless of the shape of the fixing plate 40, the center position between the first head chip 20A and the second head chip 20B is the position where the gap with the drum 17 is the narrowest in the +W direction, and thus it is preferable that the protection section 61 is provided between the first head chip 20A and the second head chip 20B in the +W direction.

Further, as illustrated in FIG. 7, when a tangent plane TP of the surface 17*a* of the drum 17 at a specific position SP becomes parallel to the surface of the fixing plate 40 in the +H direction when viewed in the L-axis direction, the normal line LN at the specific position SP is arranged at a position overlapping the protection section 61. That is, since the gap between the liquid ejecting head 10 and the drum 17 is the narrowest at the specific position SP of the drum 17, the protection section 61 is provided at the overlapping position in the direction along the normal line LN at the specific position SP, in the −Z direction in the present embodiment, and accordingly, the position of the fixing plate 40, which is closest to the drum 17 and at which the medium S collides, can be protected by the protection section 61.

The rigidity of the protection section 61 is preferably higher than the rigidity of the fixing plate 40. Here, the rigidity of the protection section 61 and the fixing plate 40 is the rigidity in the +H direction, which is the ejection direction of ink. For example, the fixing plate 40 and the protection section 61 may be made of the same material or different materials. By making the rigidity of the protection section 61 higher than the rigidity of the fixing plate 40 in this manner, deformation of the protection section 61 can be suppressed even when the medium S comes into contact with the protection section 61.

Further, it is preferable that the protection section 61 and the fixing plate 40 be separate bodies and the Young's modulus of the material constituting the protection section 61 be higher than the Young's modulus of the material constituting the fixing plate 40. By setting the Young's modulus of the material constituting the protection section 61 to be higher than the Young's modulus of the material constituting the fixing plate 40 in this manner, deformation of the protection section 61 can be suppressed even when the medium S comes into contact with the protection section 61. As a material constituting the protection section 61, for example, a cemented carbide is used.

Further, the thickness of the protection section 61 in the +H direction is preferably thicker than the thickness of the fixing plate 40 in the +H direction. By making the thickness of the protection section 61 in the +H direction thicker than that of the fixing plate 40 in this manner, the rigidity of the protection section 61 can be easily made higher than the rigidity of the fixing plate 40 in the +H direction. Therefore, even when the medium S comes into contact with the protection section 61, deformation of the protection section 61 can be suppressed. Further, by making the fixing plate 40 relatively thin, a step difference between the nozzle surface 20*a* of the nozzle plate 22 and the surface 40*a* of the fixing plate 40 is reduced, and when the ejection surface 100 is wiped by the wiping member 7, ink hardly remains on the ejection surface 100. Further, by making the fixing plate 40 relatively thin, a gap between the nozzle surface 20*a* and the medium S can be narrowed, and a shift of the landing position of the ink ejected from the nozzle 21 on the medium S can be suppressed.

Further, it is preferable that the dimension of the protection section 61 in the W-axis direction be greater than the dimension in the +H direction. By making the dimension of the protection section 61 in the +H direction relatively small in this manner, the gap between the ejection surface 100 and the medium S can be made relatively narrow, and the shift of the landing position of the ink droplets on the medium S can be suppressed, and high-speed printing can be performed. Further, by relatively increasing the dimension of the protection section 61 in the W-axis direction, by relatively increasing the area where the protection section 61 covers the fixing plate 40, the contact of the medium S with the fixing plate 40 can be suppressed, and at the same time, the area of the ejection surface 100 to be wiped by the wiping member 7 can be reduced.

The side wall portion 62 is provided to pass through the +H direction side of the first outer peripheral rib 34*a* from both end portions of the protection section 61 in the L-axis direction and to bend in the −H direction. That is, the side wall portion 62 is provided along the side surface of the holder 30.

The fixing section 63 is provided to protrude from both end portions of the side wall portion 62 in the L-axis direction in the +L direction and the −L direction, and is provided at a position overlapping the flange section 35 of the holder 30 when viewed in the +H direction. The fixing sections 63 are provided along the LW plane, and each fixing section 63 is provided with a second fixing hole 64 penetrating in the H-axis direction.

As illustrated in FIG. 3, when fixing the liquid ejecting head 10 to the support member 11 by using the fixing screw 13, the protection member 60 inserts the fixing screw 13 into the second fixing hole 64 and is interposed between the holder 30 of the liquid ejecting head 10 and the support member 11, and accordingly, the protection member 60 is fixed to the support member 11 together with the liquid ejecting head 10. That is, the protection member 60 is detachably fixed to the support member 11 by the fixing screw 13. When printing is performed on the medium S having no curvature by detachably fixing the protection member 60 to the holder 30 or the support member 11 in this manner, the protection member 60 is removed, and the liquid ejecting head 10 and the liquid ejecting head unit 8 can be used. Therefore, the gap between the ejection surface 100 and the medium S is narrowed as much as the protection member 60, and thus shift of the landing position of the ink droplets can be suppressed and high-speed printing can be performed. Further, by making the protection member 60 attachable to and detachable from the holder 30 and the support member 11, the protection member 60 can be deformed by colliding with the medium S, and when the protection member 60 deteriorates, only the protection member 60 can be replaced, and costs can be reduced because there is no need to replace the entire liquid ejecting head 10 and the liquid ejecting head unit 8.

Further, the side wall portion 62 is provided with two positioning sections 65 provided along the LW plane, and each positioning section 65 is provided with a positioning hole 66 penetrating in the H-axis direction. The support member 11 is provided with a positioning pin 11*b* protruding in the −H direction on a surface facing the −H direction around the support hole 11*a*, the positioning hole 66 of the protection member 60 is inserted into the positioning pin 11*b*, and accordingly, the protection member 60 is positioned in the LW plane with respect to the support member 11. Further, the liquid ejecting head 10 is fixed to the support member 11 in a state where the LW plane is positioned with respect to the support member 11. Similar to the positioning configuration of the protection member 60 and the support member 11, by inserting the positioning pin 11*b* into the positioning hole 38 provided in the holder 30 of the liquid ejecting head 10 illustrated in FIG. 3, the liquid ejecting head 10 is positioned with respect to the support member 11. That is, since the positioning pin 11*b* is shared by the positioning hole 38 of the liquid ejecting head 10 and the positioning hole 66 of the protection member 60, the number of components for positioning can be reduced and the positioning accuracy can be improved. As the configuration for positioning the liquid ejecting head 10 on the support member 11, another commonly used positioning configuration may be used. In this manner, by positioning and fixing the liquid ejecting head 10 and the protection member 60 in the LW plane with respect to the support member 11, the liquid ejecting head 10 and the protection member 60 can be positioned in the LW plane. Therefore, the protection section 61 can be positioned at the position where the fixing plate 40 is desired to be protected with high accuracy, and the fixing plate 40 can be reliably protected by the protection section 61.

A liquid repellent film 67 is formed on the surface of the protection section 61 facing the +H direction. The liquid repellent film 67 has liquid repellency (also referred to as water repellency) with respect to ink, and for example, a metal film containing a fluorine-based polymer, a molecular film of a metal alkoxide having liquid repellency, or the like can be used. Further, the liquid repellency of the surface of the protection section 61 facing the +H direction is preferably higher than the liquid repellency of the surface of the fixing plate 40 facing the +H direction. That is, the liquid repellency of the liquid repellent film 67 provided on the protection section 61 is preferably higher than the liquid repellency of the liquid repellent film 42 provided on the fixing plate 40. Since the surface of the protection section 61 facing the +H direction protrudes in the +H direction from the fixing plate 40, the surface may not be wiped by the wiping member 7. Therefore, by making the liquid repellency of the surface of the protection section 61 facing the +H direction higher than the liquid repellency of the surface of the fixing plate 40 facing the +H direction, it is possible to move the ink adhering to the protection section 61 to the fixing plate 40, and to suppress remaining of the ink in the protection section 61. That is, since a liquid such as ink easily moves from a region having high liquid repellency to a region having low liquid repellency, the liquid repellency of the protection section 61 is made higher than the liquid repellency of the fixing plate 40, and accordingly, the ink on the protection section 61 can be easily moved to the fixing plate 40 side. Therefore, it is possible to suppress the fall of the ink from the protection section 61 onto the medium S or the drum 17 at an unexpected timing. Incidentally, the ink adhering to the fixing plate 40 can be wiped off by the wiping member 7.

The flow path member 70 is fixed to the holder 30 in the −H direction. In addition, a flow path for supplying ink to the head chip 20 is provided inside the flow path member 70 (not illustrated), and the ink supplied from the supply member 12 is supplied to each head chip 20 via the flow path member 70. In the flow path of the flow path member 70, a filter that captures foreign matter such as dust and air bubbles contained in the ink, a pressure adjusting valve that adjusts the pressure of the ink supplied to the downstream by opening and closing according to the pressure of the flow path on the downstream, and the like may be provided.

Here, the shape of the ejection surface 100 of the liquid ejecting head 10 in a plan view when viewed in the −H direction will be described with reference to FIG. 6. The ejection surface 100 includes a first part P1, a second part P2, and a third part P3, which are illustrated by hatching in FIG. 6.

Assuming that a rectangle having the minimum area including the ejection surface 100 is R, a long side E1 of the rectangle R overlaps the side of the fixing plate 40 in the L-axis direction, and a short side E2 of the rectangle R overlaps the side of the fixing plate 40 in the W-axis direction. The center line parallel to the long side E1 of such a virtual rectangle R is set to LC. The center line LC is a straight line that passes through the center of the rectangle R with respect to the W-axis direction, in other words, the center of the first part P1 with respect to the W-axis direction, and extends in the L-axis direction.

The first part P1 is a rectangular part through which the center line LC passes. The second part P2 is a rectangular part protruding from the first part P1 in the −L direction. The third part P3 is a rectangular part protruding from the first part P1 in the +L direction. That is, the second part P2, the first part P1, and the third part P3 are arranged in this order in the +L direction in the L-axis direction.

The second part P2 and the third part P3 are positioned in opposite directions with respect to the W-axis direction with the center line LC interposed therebetween. Then, the plurality of liquid ejecting heads 10 are arranged in the L-axis direction such that the second part P2 of one liquid ejecting head 10 and the third part P3 of the other liquid ejecting head 10 face each other in the W-axis direction. In this manner, by arranging the second part P2 of one liquid ejecting head 10 and the third part P3 of the other liquid ejecting head 10 to face each other in the W-axis direction, the nozzles 21 of the liquid ejecting heads 10 that are adjacent to each other in the L-axis direction can partially overlap each other in the L-axis direction to form a continuous array of the nozzles 21 in the L-axis direction. The second part P2 and the third part P3 have a width in the W-axis direction that does not pass through the center line LC. That is, the width of each of the second part P2 and the third part P3 in the W-axis direction is less than half the width of the first part P1 in the W-axis direction. Therefore, when the plurality of liquid ejecting heads 10 are arranged in the L-axis direction, the width in the W-axis direction occupied by the plurality of liquid ejecting heads 10 is further narrowed, and the size of the liquid ejecting head unit 8 can be reduced in the W-axis direction.

In the present embodiment, the liquid ejecting head 10 is provided with the third part P3, but the present disclosure is not particularly limited thereto, and the third part P3 may not be provided. That is, when the liquid ejecting head unit 8 is formed by arranging the liquid ejecting heads 10 side by side in the L-axis direction, by arranging the second part P2 of one liquid ejecting head 10 and the second part P2 of the other liquid ejecting head 10 to face each other in the W-axis direction, the nozzles 21 of the liquid ejecting heads 10 that are adjacent to each other in the L-axis direction can partially overlap each other in the L-axis direction to form a continuous array of the nozzles 21 in the L-axis direction. However, when three or more liquid ejecting heads 10 are arranged side by side in the L-axis direction, it is possible to easily form continuous nozzles 21 in the L-axis direction by providing the third part P3 in the liquid ejecting head 10, and the size can be reduced in the W-axis direction.

In the liquid ejecting head 10, ink is supplied from the supply member 12 via the flow path member 70, ink droplets are ejected from the nozzle 21 by driving the pressure generation means in the head chip 20 based on a printing signal, and then, printing is executed on the medium S.

Further, in the liquid ejecting head 10, the tangent plane TP of the specific position SP of the surface 17*a* of the drum 17 is arranged to be parallel to the surface of the fixing plate 40 in the +H direction. The center of the first head chip 20A and the second head chip 20B in the W-axis direction, in the present embodiment, the center of the fixing plate 40 in the W-axis direction is arranged to overlap the normal line LN at the specific position SP. As a result, the gap between the nozzle surface 20*a* of the first head chip 20A and the surface 17*a* of the drum 17 and the gap between the nozzle surface 20*a* of the second head chip 20B and the surface 17*a* of the drum 17 can be made as narrow as possible, and at the same time, the gap between the two can be the same. Therefore, it is possible to narrow the gap between the medium S and the nozzle surface 20*a*, suppress the shift of the landing position of the ink droplets on the medium S, and realize high-speed printing.

In the present embodiment, two such liquid ejecting heads 10 are fixed to the support member 11 together with the protection member 60 to form the liquid ejecting head unit 8. Since the two liquid ejecting heads 10 are held by the support member 11 at the same position in the W-axis direction, the positions of the two liquid ejecting heads 10 with respect to the drum 17 are arranged as described above.

Figure 9:
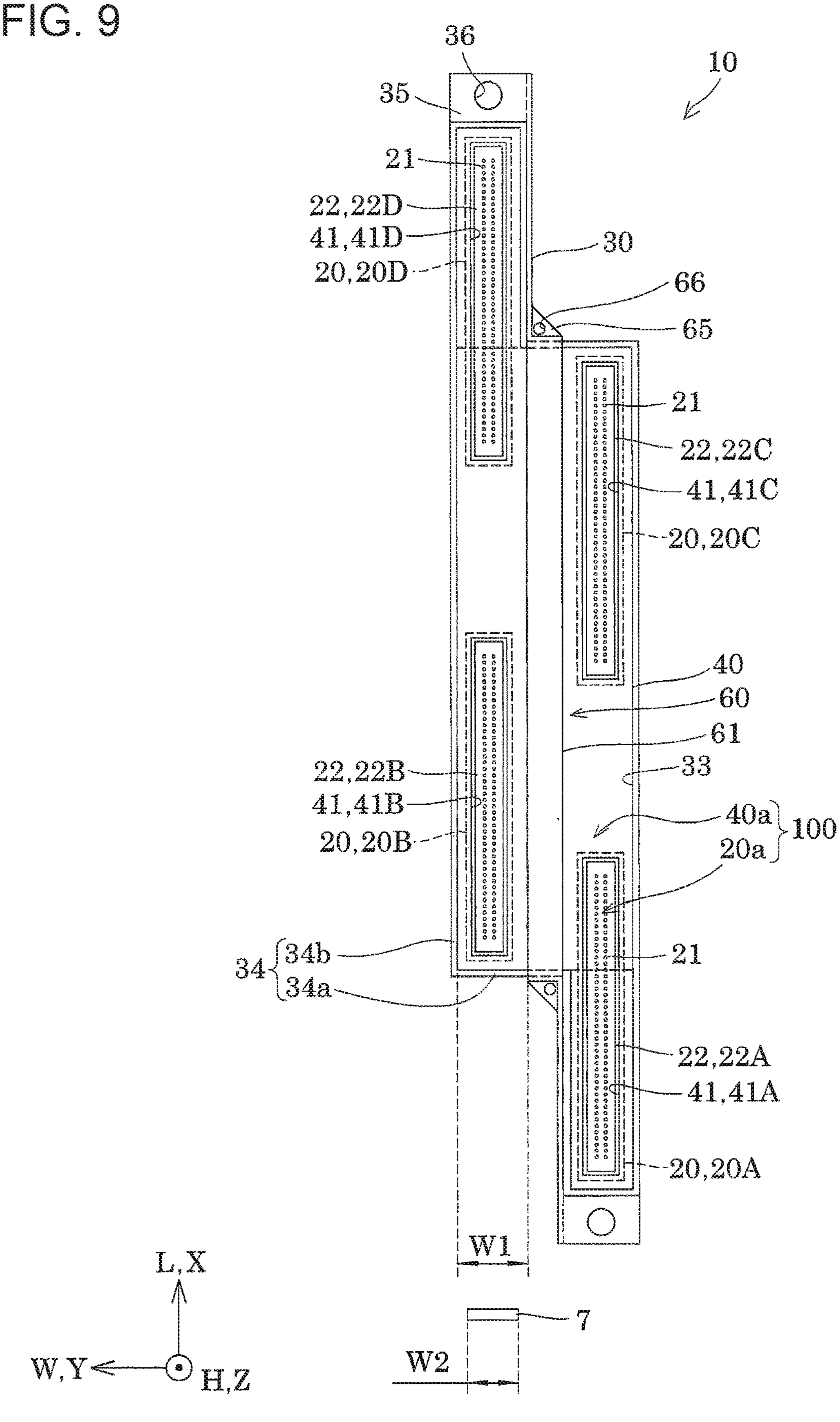
FIG. 9 is a bottom view of the liquid ejecting head and a wiping member according to Embodiment 1.

Here, as illustrated in FIG. 9, a width W2 of the wiping member 7 provided in the liquid ejecting apparatus 1 in the W-axis direction is equal to or less than a gap W1 in the W-axis direction between the second outer peripheral rib 34*b* and the protection section 61. That is, the relationship of $W2 \leq W1$ is satisfied. In the present embodiment, the relationship of $W2 < W1$ is satisfied. As a result, the ejection surface 100 between the nozzle surface 20*a* and the surface 40*a* can be wiped by the wiping member 7. Further, the ejection surface 100 is divided on both sides in the W-axis direction by the protection section 61. Therefore, when the wiping member 7 illustrated in FIG. 9 is used, by repeating a single wiping operation of moving the wiping member 7 along the L-axis direction twice on the ejection surfaces 100 on both sides in the W-axis direction divided by the protection section 61, wiping can be performed.

Figure 10:
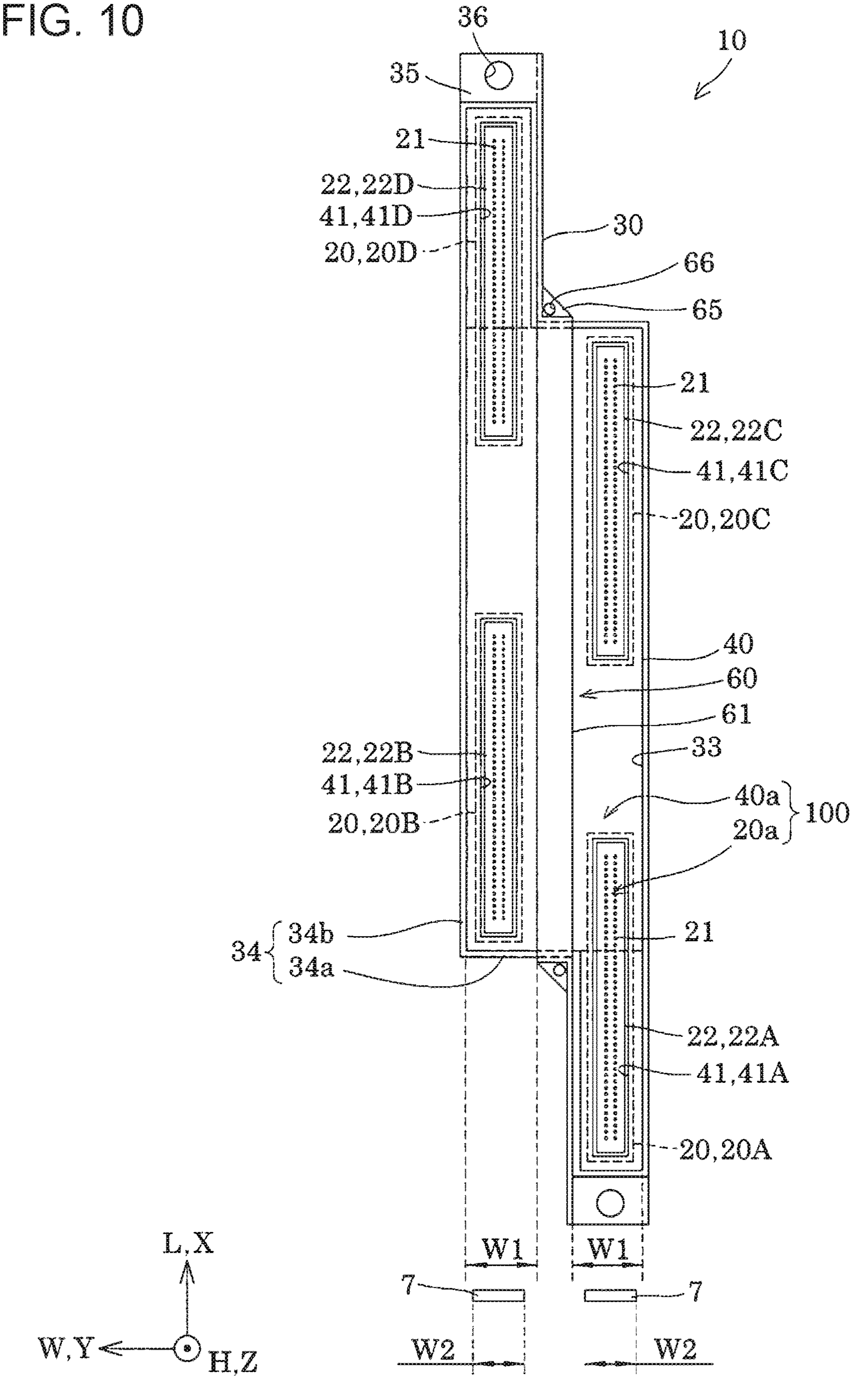
FIG. 10 is a bottom view of the liquid ejecting head and the wiping member according to Embodiment 1.

In addition, as the wiping members 7, as illustrated in FIG. 10, two wiping members 7 illustrated in FIG. 9 may be arranged side by side in the W-axis direction. By providing two wiping members 7 in the W-axis direction in this manner, the two ejection surfaces 100 can be simultaneously wiped by moving the two wiping members 7 along the L-axis direction once, that is, by one wiping operation.

Figure 11:
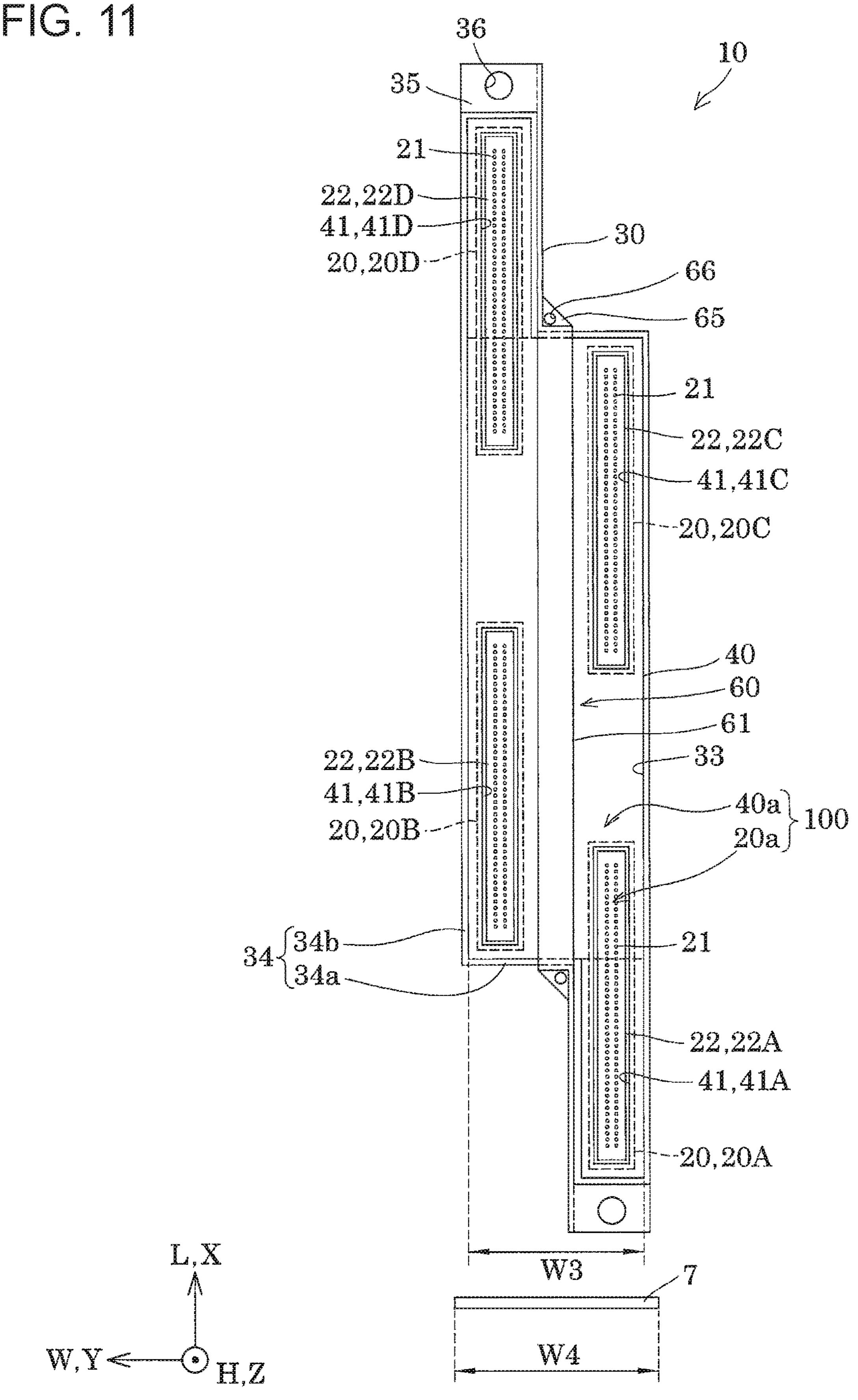
FIG. 11 is a bottom view of the liquid ejecting head and the wiping member according to Embodiment 1.

Further, as illustrated in FIG. 11, a width W4 of the wiping member 7 in the W-axis direction may be set to a gap W3 or more in the W-axis direction of the two second outer peripheral ribs 34*b*. That is, the relationship of $W4 \geq W3$ may be satisfied. By using the wiping member 7 illustrated in FIG. 11, the ejection surface 100 and the surface of the protection section 61 facing the +H direction can be simultaneously wiped by a single wiping operation.

As described above, the liquid ejecting head unit 8 according to Embodiment 1 of the present disclosure is the liquid ejecting head 10 that ejects ink, which is liquid, onto the medium S moving in the transport direction FD. In addition, the liquid ejecting head 10 includes: the first head chip 20A including the first nozzle plate 22A formed with the plurality of nozzles 21 for ejecting ink in the +H direction, which is the ejection direction; and the second head chip 20B including the second nozzle plate 22B formed with the plurality of nozzles 21 for ejecting ink in the +H direction. Further, the liquid ejecting head 10 has the first opening portion 41A that exposes at least a part of the first nozzle plate 22A and the second opening portion 41B that exposes at least a part of the second nozzle plate 22B, and has a fixing plate 40 to which the first head chip and the second head chip 20B are fixed. Further, the liquid ejecting head unit 8 includes the protection section 61 protruding in the +H direction from a surface formed with the first opening portion 41A of the fixing plate 40, and the support member 11 for supporting the liquid ejecting head 10. The protection section 61 is detachably attached to the fixing plate 40 by being interposed between the liquid ejecting head 10 and the support member 11, and the first head chip 20A and the second head chip 20B are arranged in the +Y direction, which is the transport direction.

In this manner, by providing the protection section 61, even when the medium S bends toward the liquid ejecting head 10 due to transport failures such as the medium jam, the collision of the medium S with the fixing plate 40 is suppressed, and it is possible to suppress deformation of the fixing plate 40 due to the collision with the medium S and deformation of the nozzle plate 22 due to the deformation of the fixing plate 40. By suppressing the deformation of the fixing plate 40, it is possible to suppress the formation of a recess portion on the surface of the fixing plate 40, and it is possible to suppress the occurrence of wiping failures by the wiping member 7 due to the recess portion. Further, by suppressing the deformation of the nozzle plate 22, it is possible to suppress the shift of the landing position of the ink droplets on the medium S. Further, it is possible to suppress the peeling of the fixing plate 40 and the head chip 20 from each other due to the impact of the medium S and entrance of the ink into the space holding the head chip 20. Further, the protection section 61 is detachably attached to the fixing plate 40. Therefore, when printing is performed on the medium S having no curvature, the protection section 61 is removed, and the liquid ejecting head 10 and the liquid ejecting head unit 8 can be used. Therefore, the gap between the ejection surface 100 and the medium S is narrowed as much as the protection section 61, and thus shift of the landing position of the ink droplets can be suppressed and high-speed printing can be performed. Further, by making the protection section 61 attachable to and detachable from the holder 30 and the support member 11, when the protection section 61 deteriorates due to deformation due to collision of the medium S with the protection section 61, only the protection section 61 can be replaced, and costs can be reduced because there is no need to replace the entire liquid ejecting head 10 and the liquid ejecting head unit 8.

Figure 12:
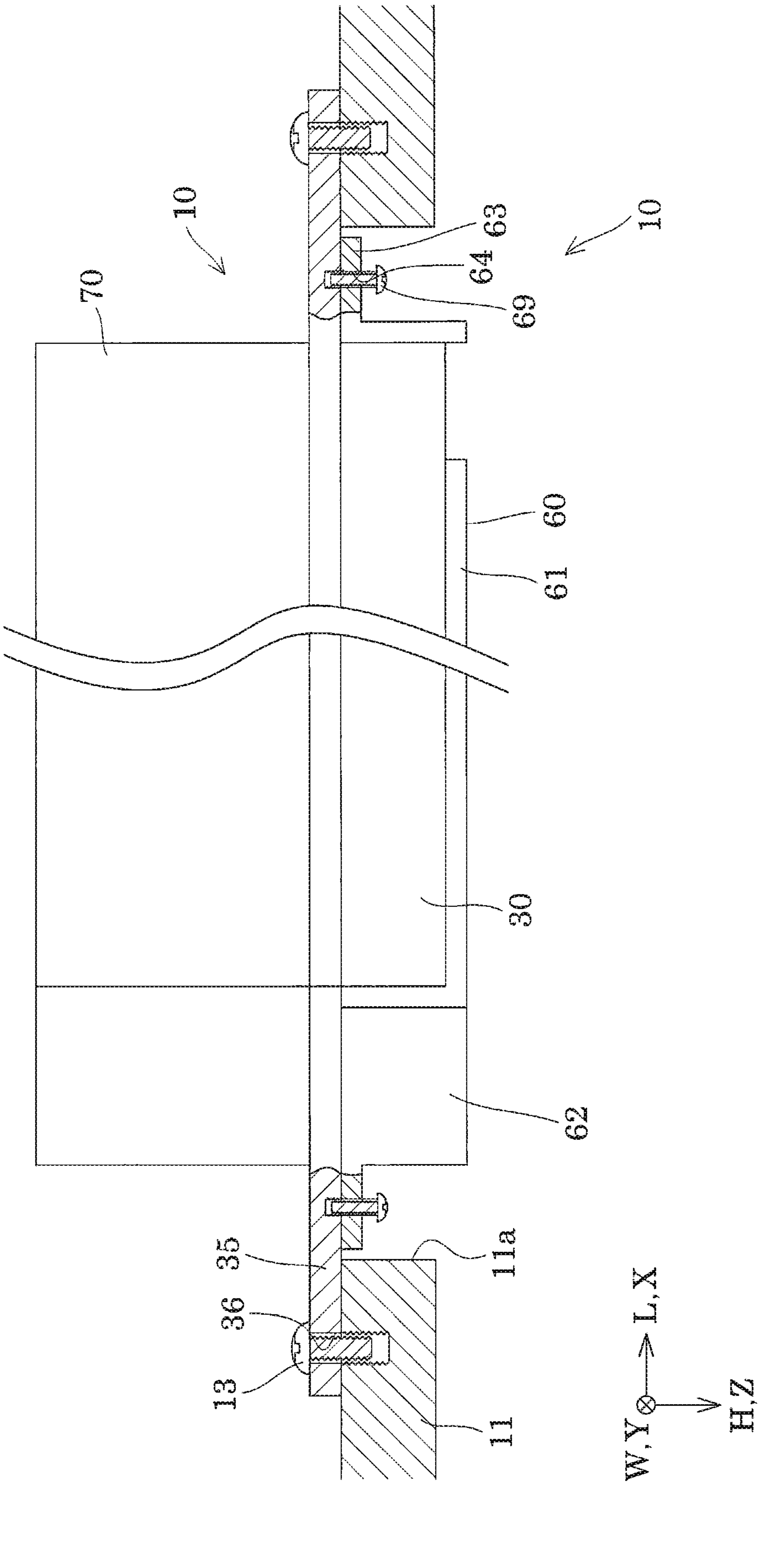
FIG. 12 is a sectional view of a main portion illustrating a modification example of the liquid ejecting head according to Embodiment 1.

In the present embodiment, the liquid ejecting head 10 and the protection member 60 are fixed to the support member 11 by the fixing screw 13, but the present embodiment is not particularly limited thereto. Here, FIG. 12 illustrates a modification example of the liquid ejecting head unit 8. FIG. 12 is a sectional view of a main portion showing a modification example of the liquid ejecting head 10.

As illustrated in FIG. 12, the liquid ejecting head 10 is fixed to the support member 11 by the first fixing screw 13. Further, the protection member 60 is detachably fixed to the flange section 35 of the holder 30 by a second fixing screw 69 different from the first fixing screw 13. That is, the second fixing screw 69 is inserted into the second fixing hole 64 of the fixing section 63 in the −H direction, and is detachably fixed by screwing the second fixing screw 69 into the flange section 35.

In such a configuration, since the protection member 60 is detachably provided on the holder 30, the liquid ejecting head 10 including the protection member 60 is formed. Since the configuration of the protection member 60 having the protection section 61 and the position of the protection section 61 with respect to the fixing plate 40 are the same as those described above, the overlapping description thereof will be omitted.

As illustrated in FIG. 12, the liquid ejecting head 10 according to Embodiment 1 of the present disclosure include the first head chip 20A including the first nozzle plate 22A formed with the plurality of nozzles 21 for ejecting ink, which is liquid, in the +H direction, which is the ejection direction, and having the +L direction, which is the first direction, as the longitudinal direction when viewed in the +H direction. Further, the liquid ejecting head 10 includes the second head chip 20B including the second nozzle plate 22B formed with the plurality of nozzles 21 for ejecting ink in the +H direction, and having the +L direction as the longitudinal direction when viewed in the +H direction. Further, the liquid ejecting head 10 includes the fixing plate 40 which has the first opening portion 41A exposing at least a part of the first nozzle plate 22A and the second opening portion 41B exposing at least a part of the second nozzle plate 22B, and to which the first head chip 20A and the second head chip 20B are fixed; and the protection section 61 protruding in the +H direction from the surface 40*a* of the fixing plate 40 formed with the first opening portion 41A. Further, the first head chip 20A and the second head chip 20B are shifted from each other in the +L direction and the +W direction which is the second direction orthogonal to both the +H direction and the +L direction, and partially overlap each other when viewed in the +W direction, and the protection section 61 is arranged between the first head chip 20A and the second head chip 20B in the +W direction.

The liquid ejecting head 10 illustrated in FIG. 12 is a liquid ejecting head that ejects ink, which is liquid, onto the medium S moving in the transport direction FD. In addition, the liquid ejecting head 10 includes: the first head chip 20A including the first nozzle plate 22A formed with the plurality of nozzles 21 for ejecting ink in the +H direction, which is the ejection direction; and the second head chip 20B including the second nozzle plate 22B formed with the plurality of nozzles 21 for ejecting ink in the +H direction. Further, the liquid ejecting head 10 has the first opening portion 41A that exposes at least a part of the first nozzle plate 22A and the second opening portion 41B that exposes at least a part of the second nozzle plate 22B, and has the fixing plate 40 to which the first head chip 20A and the second head chip 20B are fixed. Further, the liquid ejecting head 10 includes the protection section 61 protruding in the +H direction from the surface 40*a* formed with the first opening portion 41A of the fixing plate 40. In addition, the protection section 61 is arranged between the first head chip 20A and the second head chip 20B in the +W direction, which is the transport direction.

In this manner, by providing the protection section 61, even when the medium S bends toward the liquid ejecting head 10 due to transport failures such as the medium jam, the collision of the medium S with the fixing plate 40 is suppressed, and it is possible to suppress deformation of the fixing plate 40 due to the collision with the medium S and deformation of the nozzle plate 22 due to the deformation of the fixing plate 40. By suppressing the deformation of the fixing plate 40, it is possible to suppress the formation of a recess portion on the surface of the fixing plate 40, and it is possible to suppress the occurrence of wiping failures by the wiping member 7 due to the recess portion. Further, by suppressing the deformation of the nozzle plate 22, it is possible to suppress the shift of the landing position of the ink droplets on the medium S. Further, it is possible to suppress the peeling of the fixing plate 40 and the head chip 20 from each other due to the impact of the medium S and entrance of the ink into the space holding the head chip 20.

Further, in the liquid ejecting head 10 illustrated in FIG. 12, it is preferable that the protection section 61 be detachably attached to the fixing plate 40. In this manner, the protection section 61 is detachably attached to the fixing plate 40. Therefore, when printing is performed on the medium S having no curvature, the protection section 61 is removed, and the liquid ejecting head 10 and the liquid ejecting head unit 8 can be used. Therefore, the gap between the ejection surface 100 and the medium S is narrowed as much as the protection section 61, and thus shift of the landing position of the ink droplets can be suppressed and high-speed printing can be performed. Further, by making the protection section 61 attachable to and detachable from the holder 30 and the support member 11, when the protection section 61 is deformed by collision of the medium S, or when the protection section 61 deteriorates, only the protection section 61 can be replaced, and costs can be reduced because there is no need to replace the entire liquid ejecting head 10.

Further, in the liquid ejecting head unit 8 and the liquid ejecting head 10 of the present embodiment, it is preferable that the protection section 61 be arranged at the center position of the fixing plate 40 in the +W direction, which is the second direction. In this manner, by providing the protection section 61 at the center position in the +W direction of the fixing plate 40 in which the gap between the fixing plate 40 and the medium S is the narrowest and the medium S easily comes into contact with the fixing plate 40, the contact of the medium S with the fixing plate 40 can be suppressed.

Further, in the liquid ejecting head unit 8 and the liquid ejecting head 10 of the present embodiment, it is preferable that the protection section 61 be arranged at the center position between the first head chip 20A and the second head chip 20B in the +W direction which is the second direction. The first head chip 20A and the second head chip 20B are adjacent to each other in the +W direction. In this manner, by providing the protection section 61 at the center position between the first head chip 20A and the second head chip 20B in the +W direction, at which the gap between the fixing plate 40 and the medium S is the narrowest and the medium S easily comes into contact with the fixing plate 40, the contact of the medium S with the fixing plate 40 can be suppressed.

Further, in the liquid ejecting head unit 8 and the liquid ejecting head 10 of the present embodiment, it is preferable that the rigidity of the protection section 61 in the +H direction, which is the ejection direction, be higher than the rigidity of the fixing plate 40 in the +H direction. By making the rigidity of the protection section 61 higher than the rigidity of the fixing plate 40 in this manner, deformation of the protection section 61 can be suppressed even when the medium S comes into contact with the protection section 61.

Further, in the liquid ejecting head unit 8 and the liquid ejecting head 10 of the present embodiment, it is preferable that the protection section 61 and the fixing plate 40 be separate bodies and the Young's modulus of the material constituting the protection section 61 be higher than the Young's modulus of the material constituting the fixing plate 40. By setting the Young's modulus of the material constituting the protection section 61 to be higher than the Young's modulus of the material constituting the fixing plate 40 in this manner, deformation of the protection section 61 can be suppressed even when the medium S comes into contact with the protection section 61.

Further, in the liquid ejecting head unit 8 and the liquid ejecting head 10 of the present embodiment, it is preferable that the thickness of the protection section 61 in the +H direction, which is the ejection direction, be greater than the thickness of the fixing plate 40 in the +H direction. By making the thickness of the protection section 61 in the +H direction thicker than that of the fixing plate 40 in this manner, the rigidity of the protection section 61 can be easily made higher than the rigidity of the fixing plate 40 in the +H direction. Therefore, even when the medium S comes into contact with the protection section 61, deformation of the protection section 61 can be suppressed. Further, by making the fixing plate 40 relatively thin, a step difference between the nozzle surface 20*a* of the nozzle plate 22 and the surface 40*a* of the fixing plate 40 is reduced, and when the ejection surface 100 is wiped by the wiping member 7, ink hardly remains on the ejection surface 100. Further, by making the fixing plate 40 relatively thin, a gap between the nozzle surface 20*a* and the medium S can be narrowed, and a shift of the landing position of the ink ejected from the nozzle 21 on the medium S can be suppressed.

Further, in the liquid ejecting head unit 8 and the liquid ejecting head 10 of the present embodiment, it is preferable that the liquid repellency of the surface of the protection section 61 facing the +H direction, which is the ejection direction, be higher than the liquid repellency of the surface of the fixing plate 40 facing the ejection direction +H direction, which is the ejection direction. According to this, when the protection section 61 is not wiped by the wiping member 7, there is a concern that the ink adhering to the medium S adheres to the protection section 61. By making the liquid repellency of the protection section 61 higher than that of the fixing plate 40, it is possible to make it easy to move the ink adhering to the protection section 61 to the fixing plate 40 and to suppress remaining of the ink in the protection section 61. Therefore, it is possible to suppress falling of the ink adhering to the protection section 61 onto the drum 17 or the medium S at an unexpected timing.

Further, in the liquid ejecting head unit 8 and the liquid ejecting head 10 of the present embodiment, it is preferable that the dimension of the protection section 61 in the +W direction, which is the second direction, be greater than the dimension of the protection section 61 in the +H direction, which is the ejection direction. According to this, by making the dimension of the protection section 61 in the +H direction relatively small in this manner, the gap between the ejection surface 100 and the medium S can be made relatively narrow, and the shift of the landing position of the ink droplets on the medium S can be suppressed, and high-speed printing can be performed. Further, by relatively increasing the dimension of the protection section 61 in the W-axis direction, by relatively increasing the area where the protection section 61 covers the fixing plate 40, the contact of the medium S with the fixing plate 40 can be suppressed, and at the same time, the area of the ejection surface 100 to be wiped by the wiping member 7 can be reduced.

In addition, the liquid ejecting head 10 illustrated in FIG. 12 includes: the third head chip 20C that includes the third nozzle plate 22C formed with the plurality of nozzles 21 for ejecting ink, which is liquid, in the +H direction, which is the ejection direction, and has the +L direction as the longitudinal direction when viewed in the +H direction; and the fourth head chip 20D that includes the fourth nozzle plate 22D formed with the plurality of nozzles 21 for ejecting ink in the +H direction and has the +L direction as the longitudinal direction when viewed in the +H direction. Further, the fixing plate 40 has the third opening portion 41C exposing at least a part of the third nozzle plate 22C and the fourth opening portion 41D exposing at least a part of the fourth nozzle plate 22D, and has the third head chip 20C and the fourth head chip 20D that are fixed thereto. In addition, the first head chip 20A and the third head chip 20C are arranged side by side in the +L direction, and the second head chip 20B and the fourth head chip 20D are arranged side by side in the +L direction. Further, one end of the third head chip 20C overlaps a part of the second head chip 20B when viewed in the +W direction, and the other end of the third head chip 20C overlaps a part of the fourth head chip 20D when viewed in the +W direction. In addition, the protection section 61 is arranged between the second head chip 20B and the third head chip 20C and between the third head chip 20C and the fourth head chip 20D in the +W direction. In this manner, by providing the protection section 61 also between the second head chip 20B and the third head chip 20C and between the third head chip 20C and the fourth head chip 20D, it is possible to suppress the contact of the medium S with the fixing plate 40 between the second head chip 20B and the third head chip 20C and between the third head chip 20C and the fourth head chip 20D.

The liquid ejecting apparatus 1 according to Embodiment 1 of the present disclosure includes: the liquid ejecting head 10; and the liquid storage section 9 for storing the liquid supplied to the liquid ejecting head 10. In the liquid ejecting apparatus 1 of the present embodiment, it is possible to suppress the contact of the medium S with the fixing plate 40 by the protection section 61, and to suppress the deformation and peeling of the fixing plate 40 due to the contact of the medium S with the fixing plate 40.

In addition, in the liquid ejecting apparatus 1 of the present embodiment, the drum 17 which is a cylindrical member rotating around the rotation shaft 18 extending in the +L direction, which is the first direction, and the liquid ejecting head 10 according to the above description, arranged along the drum 17, are provided. Further, when the tangent plane TP of the surface 17*a* of the drum 17 at the specific position SP is parallel to the surface 40*a* of the fixing plate 40 when viewed in the +L direction, it is preferable that the normal line LN of the tangent plane TP at the specific position SP overlap the protection section 61. According to this, the fixing plate 40 can be reliably protected from the contact with the medium S by providing the protection section 61 at the portion of the ejection surface 100 of the liquid ejecting head 10 closest to the surface 40*a* of the drum 17.

In addition, in the liquid ejecting apparatus 1 of the present embodiment, the drum 17 which is a cylindrical member rotating around the rotation shaft 18 extending in the +L direction, which is the first direction orthogonal to both the transport direction FD and the +H direction which is the ejection direction, and the liquid ejecting head 10 according to the above description, arranged along the drum 17, are provided. Further, when the tangent plane TP of the surface 17*a* of the drum 17 at the specific position SP is parallel to the surface 40*a* of the fixing plate 40 when viewed in the +L direction, it is preferable that the normal line LN of the tangent plane TP at the specific position SP overlap the protection section 61. According to this, the fixing plate 40 can be reliably protected from the contact with the medium S by providing the protection section 61 at the portion of the ejection surface 100 of the liquid ejecting head 10 closest to the surface 40*a* of the drum 17.

Further, in the liquid ejecting apparatus 1 of the present embodiment, the liquid ejecting head 10 described above, and the wiping member 7 that wipes the ejection surface 100 including the first nozzle plate 22A, the second nozzle plate 22B, and the surface 40*a* of the fixing plate 40 are provided. Further, it is preferable that the wiping member 7 wipe the ejection surface 100 while relatively moving in the +L direction with respect to the liquid ejecting head 10. According to this, when the width of the wiping member 7 in the W-axis direction is the width with which the surface of the protection section 61 is not wiped as illustrated in FIGS. 9 and 10, wiping performance can be improved by reducing unwiped portions of the ejection surface 100 that are caused by step difference caused by the protection section 61.

Further, in the liquid ejecting apparatus 1 of the present embodiment, the liquid ejecting head 10 described above, and the wiping member 7 that wipes the ejection surface 100 including the first nozzle plate 22A, the second nozzle plate 22B, and the surface 40*a* of the fixing plate 40 are provided. Further, it is preferable that the wiping member 7 wipes the ejection surface 100 while relatively moving in the +L direction orthogonal to both the transport direction FD and the +H direction, which is the ejection direction, with respect to the liquid ejecting head 10. According to this, when the width of the wiping member 7 in the W-axis direction is the width with which the surface of the protection section 61 is not wiped as illustrated in FIGS. 9 and 10, wiping performance can be improved by reducing unwiped portions of the ejection surface 100 that are caused by step difference caused by the protection section 61.

Embodiment 2

Figure 13:
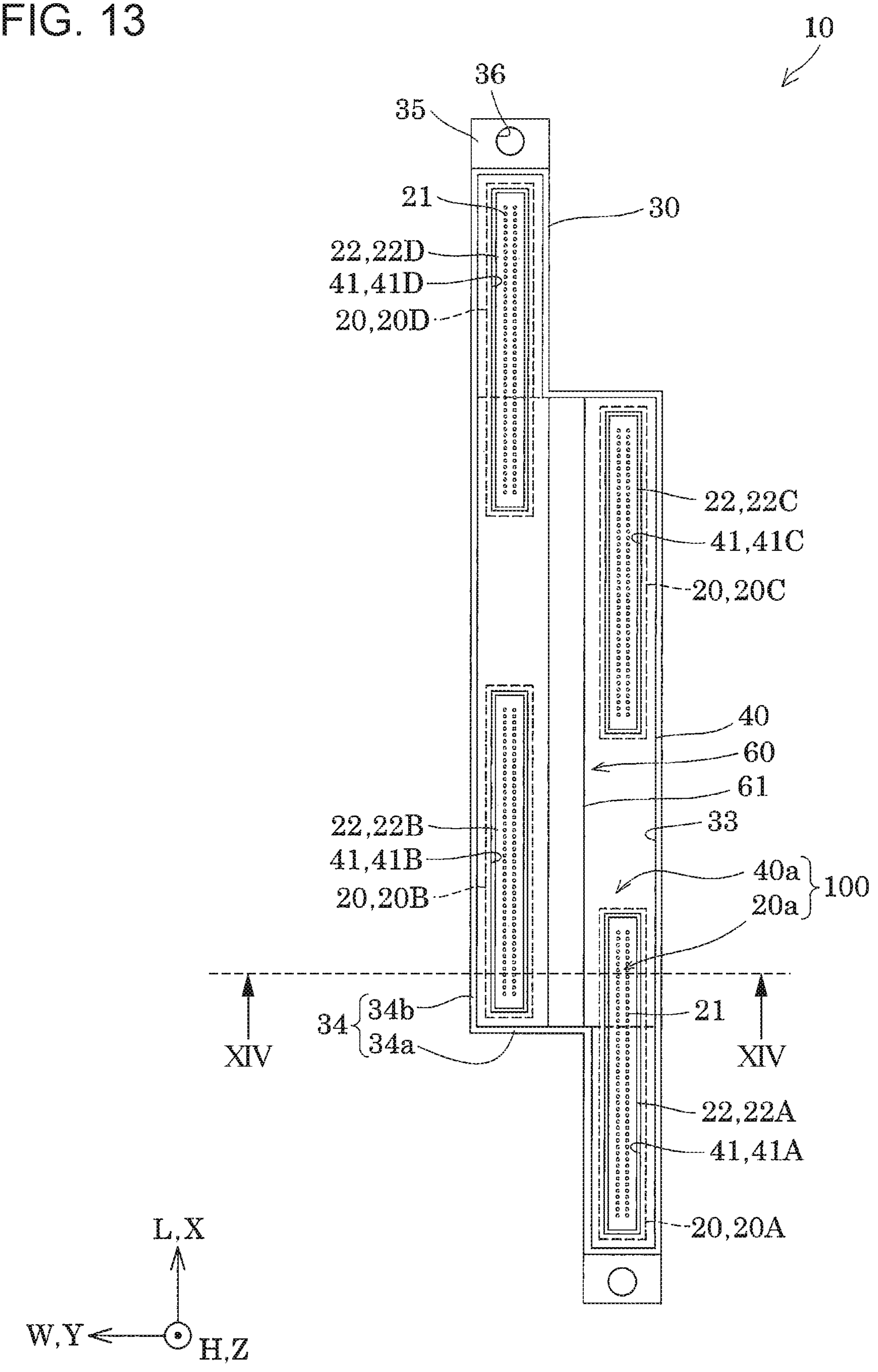
FIG. 13 is a bottom view of a liquid ejecting head according to Embodiment 2.
Figure 14:
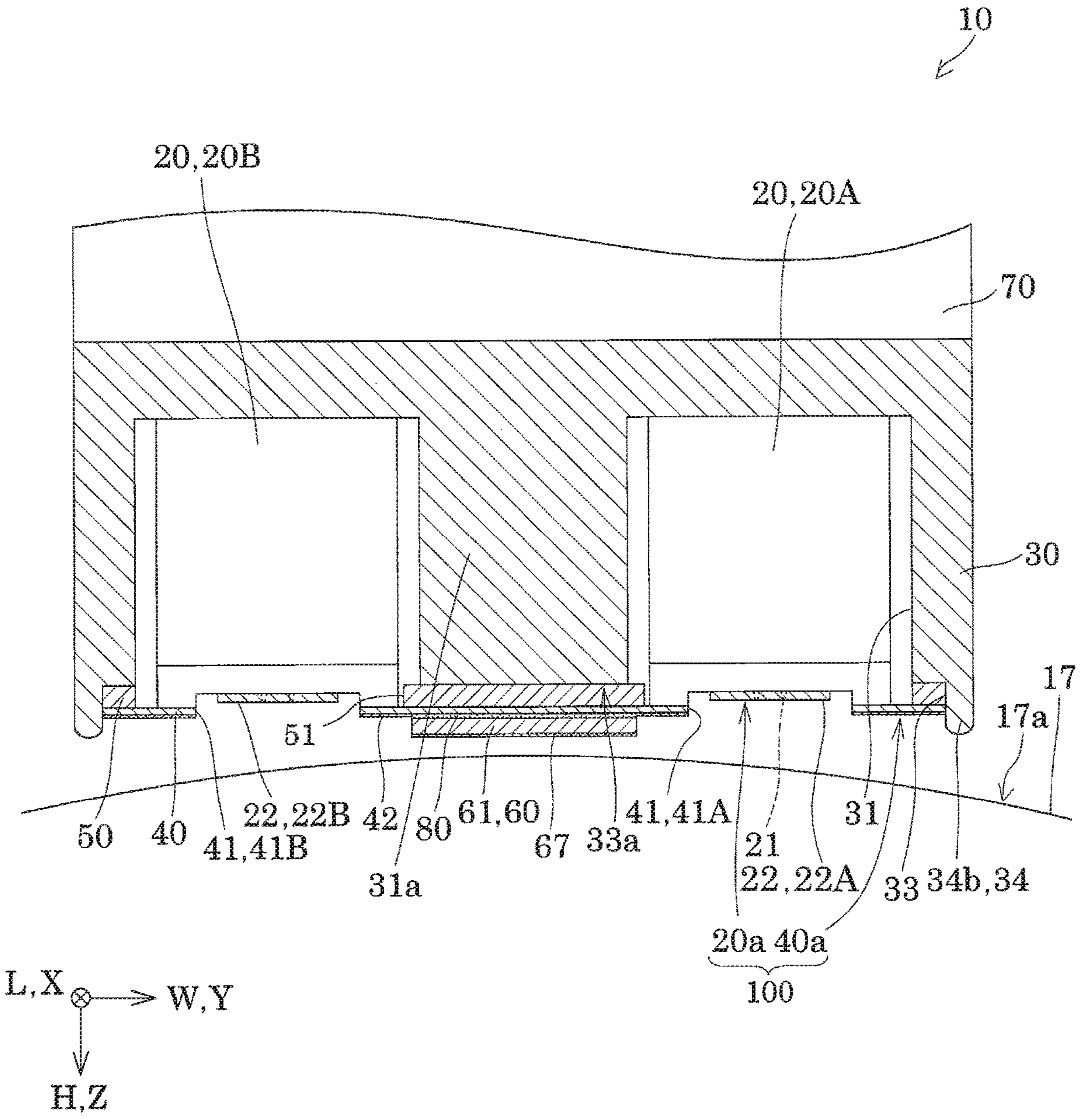
FIG. 14 is a sectional view of a main portion of the liquid ejecting head and a drum according to Embodiment 2.

FIG. 13 is a bottom view of the liquid ejecting head 10 according to Embodiment 2 of the present disclosure when viewed in the −H direction. FIG. 14 is a sectional view of a main portion of the liquid ejecting head 10 and the drum 17 according to Embodiment 2. The same reference numerals will be given to the same members as those in the above-described embodiment, and overlapping description thereof will be omitted.

As illustrated in the drawing, the liquid ejecting head 10 of the present embodiment includes the head chip 20, the holder 30, the fixing plate 40, the reinforcing plate 50, the protection member 60, and the flow path member 70.

Since the head chip 20, the holder 30, the fixing plate 40, the reinforcing plate 50, and the flow path member 70 are the same as those in Embodiment 1, the overlapping description thereof will be omitted.

The protection member 60 includes only the protection section 61. That is, the protection member 60 is not provided with the side wall portion 62 and the fixing section 63 of Embodiment 1. Such a protection member 60 is adhered to a surface of the fixing plate 40 facing the +H direction via an adhesive 80. The part of the fixing plate 40 to which the protection member 60 is adhered is a non-liquid repellent region in which the liquid repellent film 42 is not formed. Therefore, the fixing plate 40 and the protection member 60 can be firmly adhered to each other by the adhesive 80.

The protection member 60 is arranged at the same position as the protection section 61 of Embodiment 1 described above. By providing the protection member 60 having the protection section 61 in this manner, similar to Embodiment 1 described above, it is possible to suppress the contact of the medium S or the drum 17 with the fixing plate 40, to suppress deformation of the fixing plate 40, to suppress positional shift of nozzle plate 22 due to deformation of the fixing plate 40, and to suppress shift of landing position of ink droplets on the medium S due to the positional shift of the nozzle plate 22. In addition, it is possible to suppress problems such as peeling of the fixing plate 40 and the head chip 20 due to the deformation of the fixing plate 40, and entrance of ink into the accommodation section 31.

As described above, the liquid ejecting head 10 according to Embodiment 2 of the present disclosure includes the first head chip 20A including the first nozzle plate 22A formed with the plurality of nozzles 21 for ejecting ink, which is liquid, in the +H direction, which is the ejection direction, and having the +L direction, which is the first direction, as a longitudinal direction when viewed in the +H direction. Further, the liquid ejecting head 10 includes the second head chip 20B including the second nozzle plate 22B formed with the plurality of nozzles 21 for ejecting ink in the +H direction, and having the +L direction as the longitudinal direction when viewed in the +H direction. Further, the liquid ejecting head 10 includes the fixing plate 40 which has the first opening portion 41A exposing at least a part of the first nozzle plate 22A and the second opening portion 41B exposing at least a part of the second nozzle plate 22B, and to which the first head chip 20A and the second head chip 20B are fixed; and the protection section 61 protruding in the +H direction from the surface 40*a* of the fixing plate 40 formed with the first opening portion 41A. Further, the first head chip 20A and the second head chip 20B are shifted from each other in the +L direction and the +W direction which is the second direction orthogonal to both the +H direction and the +L direction, and partially overlap each other when viewed in the +W direction, and the protection section 61 is arranged between the first head chip 20A and the second head chip 20B in the +W direction.

Further, the liquid ejecting head 10 of the present embodiment is a liquid ejecting head that ejects ink, which is liquid, onto the medium S moving in the transport direction FD. In addition, the liquid ejecting head 10 includes: the first head chip 20A including the first nozzle plate 22A formed with the plurality of nozzles 21 for ejecting ink in the +H direction, which is the ejection direction; and the second head chip 20B including the second nozzle plate 22B formed with the plurality of nozzles 21 for ejecting ink in the +H direction. Further, the liquid ejecting head 10 has the first opening portion 41A that exposes at least a part of the first nozzle plate 22A and the second opening portion 41B that exposes at least a part of the second nozzle plate 22B, and has the fixing plate 40 to which the first head chip 20A and the second head chip 20B are fixed. Further, the liquid ejecting head 10 includes the protection section 61 protruding in the +H direction from the surface 40*a* formed with the first opening portion 41A of the fixing plate 40. In addition, the protection section 61 is arranged between the first head chip 20A and the second head chip 20B in the +W direction, which is the transport direction.

In this manner, by providing the protection section 61, even when the medium S bends toward the liquid ejecting head 10 due to transport failures such as the medium jam, the collision of the medium S with the fixing plate 40 is suppressed, and it is possible to suppress deformation of the fixing plate 40 due to the collision with the medium S and deformation of the nozzle plate 22 due to the deformation of the fixing plate 40. By suppressing the deformation of the fixing plate 40, it is possible to suppress the formation of a recess portion on the surface of the fixing plate 40, and it is possible to suppress the occurrence of wiping failures by the wiping member 7 due to the recess portion. Further, by suppressing the deformation of the nozzle plate 22, it is possible to suppress the shift of the landing position of the ink droplets on the medium S. Further, it is possible to suppress the peeling of the fixing plate 40 and the head chip 20 from each other due to the impact of the medium S and entrance of the ink into the space holding the head chip 20.

Embodiment 3

Figure 15:
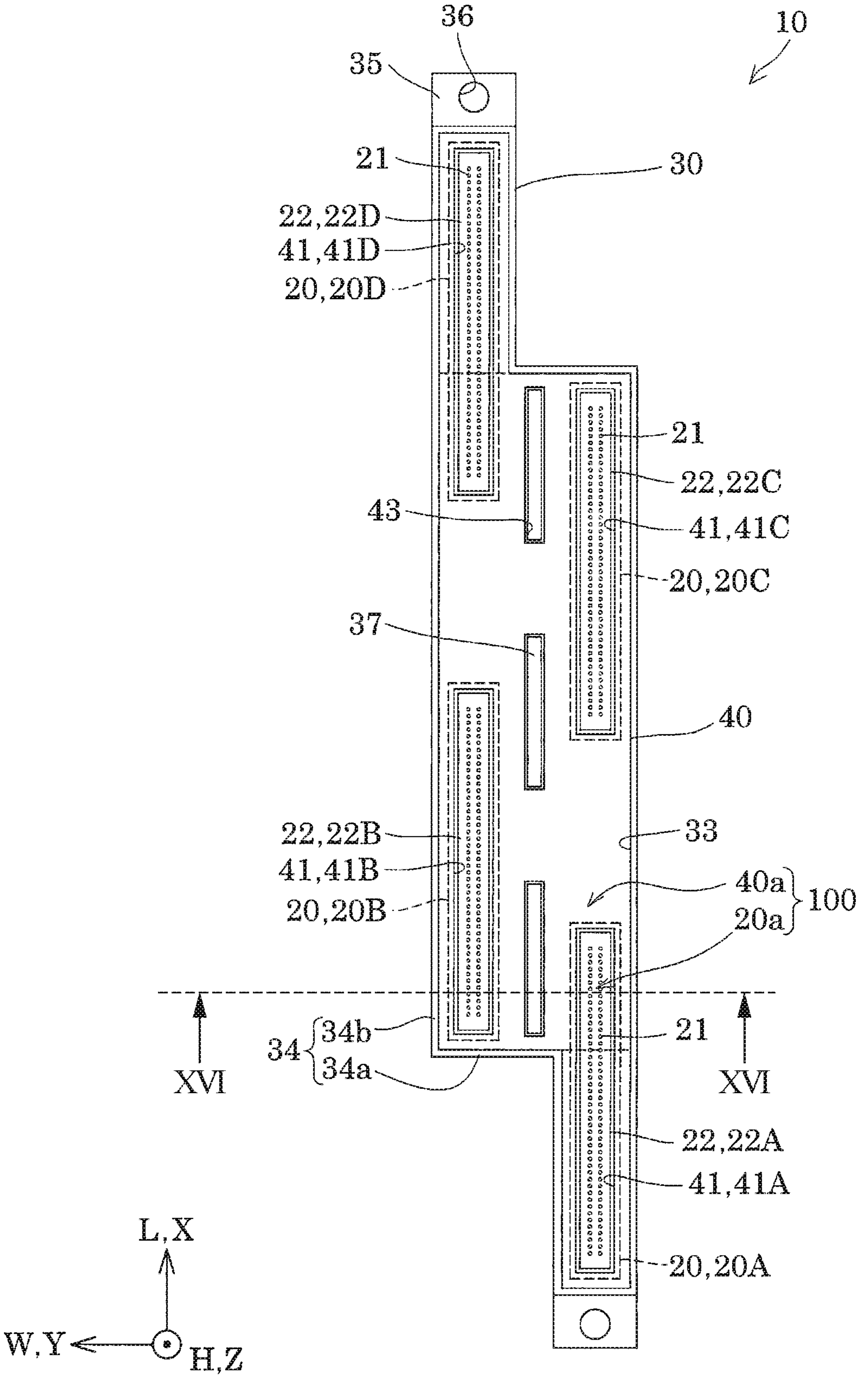
FIG. 15 is a bottom view of a liquid ejecting head according to Embodiment 3.
Figure 16:
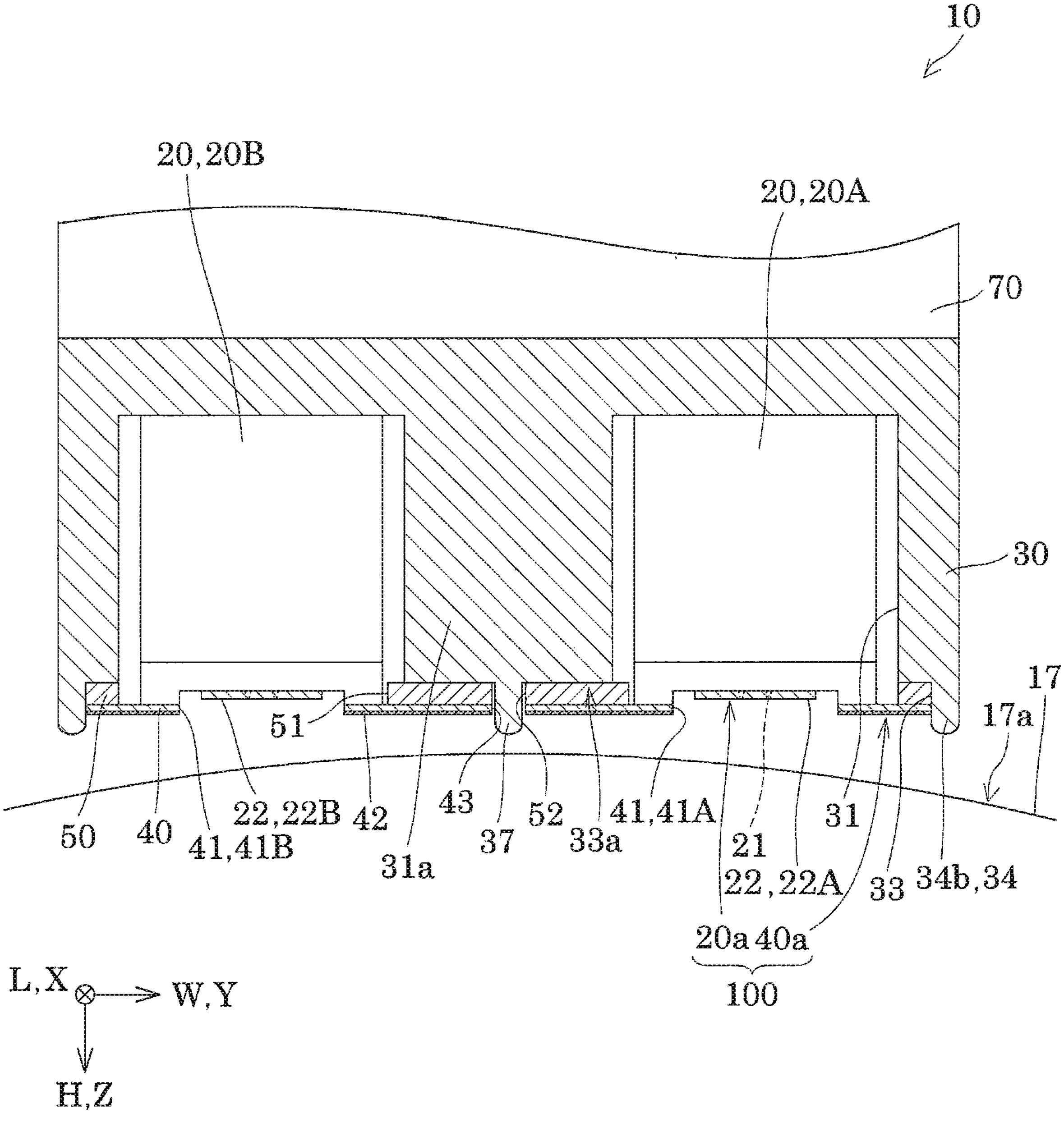
FIG. 16 is a sectional view of a main portion of the liquid ejecting head and a drum according to Embodiment 3.

FIG. 15 is a bottom view of the liquid ejecting head 10 according to Embodiment 3 of the present disclosure when viewed in the −H direction. FIG. 16 is a sectional view of a main portion of the liquid ejecting head 10 and the drum 17 according to Embodiment 3. The same reference numerals will be given to the same members as those in the above-described embodiment, and overlapping description thereof will be omitted.

As illustrated in the drawing, the fixing plate 40 is provided with a through-hole 43 penetrating in the +H direction. The through-hole 43 is provided in a region facing the partition wall 31*a* that partitions the accommodation section 31 of the holder 30 in the +H direction. In the present embodiment, the through-hole 43 is provided between the first head chip 20A and the second head chip 20B in the W-axis direction. Further, the through-hole 43 is provided between the second head chip 20B and the third head chip 20C in the W-axis direction. Further, the through-hole 43 is provided between the third head chip 20C and the fourth head chip 20D in the W-axis direction. That is, in the present embodiment, a plurality of through-holes 43 are provided with gaps in the L-axis direction, and in the present embodiment, three are provided. Among the three through-holes 43 of the present embodiment, any one corresponds to the "first through-hole" and the other one corresponds to the "second through-hole". That is, the first through-hole and the second through-hole are arranged with a gap in the L-axis direction. The number of through-holes 43 is not particularly limited, and may be one or a plurality of (two or more) through-holes 43. Further, the through-hole 43 may be formed to open at the end portion of the fixing plate 40 in the L-axis direction.

The reinforcing plate 50 is provided with a communication through-hole 52 that communicates with each through-hole 43 of the fixing plate 40. The communication through-hole 52 is provided to penetrate the reinforcing plate 50 in the +H direction independently for each through-hole 43. That is, three communication through-holes 52 are provided in the reinforcing plate 50.

The partition wall 31*a* of the holder 30 is provided with a protrusion portion 37 corresponding to each through-hole 43 and protruding from the fixing plate 40 in the +H direction through the communication through-hole 52 and the through-hole 43. That is, the distal end of the protrusion portion 37 in the +H direction is positioned in the +H direction with respect to the surface of the fixing plate 40 facing the +H direction. In the present embodiment, the protrusion portion 37 of the holder 30 corresponds to the "protection section".

The protrusion portion 37 is arranged at the same position as the protection section 61 in Embodiments 1 and 2 described above. Therefore, by providing the protrusion portion 37 which is the protection section at a position, which is closest to the drum 17 and at which the medium S easily comes into contact with the drum 17, it is possible to suppress the contact of the medium S with the fixing plate 40, and to suppress the deformation and peeling of the fixing plate 40 due to the contact of the medium S with the fixing plate 40. Therefore, it is possible to suppress the shift of the landing position of the ink droplets on the medium S and the entrance of the ink into the accommodation section 31.

Further, the rigidity of the protrusion portion 37 of the holder 30 in the +H direction is higher than the rigidity of the fixing plate 40 in the +H direction. Therefore, the protrusion portion 37 is unlikely to be deformed by the contact with the medium S, and the fixing plate 40 is also unlikely to be deformed due to the deformation of the protrusion portion 37. Further, even when the medium S comes into contact with the protrusion portion 37 of the holder 30, the fixing plate 40 does not exist in the −H direction of the protrusion portion 37, and thus the fixing plate 40 is not easily deformed. Therefore, even when the protrusion amount of the protrusion portion 37 from the surface of the fixing plate 40 is reduced, the fixing plate 40 can be protected by the protrusion portion 37. It is preferable that the distal end of the protrusion portion 37 in the +H direction and the distal end of the second outer peripheral rib 34*b* in the +H direction be at the same position in the +H direction. By setting the position of the distal end of the protrusion portion 37 and the distal end of the second outer peripheral rib 34*b* at the same position in the +H direction, when performing the wiping by the wiping member 7 as illustrated in FIG. 11 of Embodiment 1 described above while being in contact with the second outer peripheral rib 34*b* and the protrusion portion 37, it is possible to evenly bring the wiping member 7 into contact with the ejection surface 100, and to suppress the occurrence of unwiped ink on the ejection surface 100.

Further, by providing the plurality of through-holes 43 with gaps in the L-axis direction, it is possible to suppress the division of the fixing plate 40 on both sides in the W-axis direction starting from the through-hole 43, and to suppress a significant decrease in the rigidity of the fixing plate 40. Therefore, it is possible to suppress a decrease in the relative positioning accuracy of the plurality of head chips 20 due to the fixing plate 40, and to suppress the shift of the landing position of the ink droplet on the medium S.

In the present embodiment, the protrusion portion 37 is provided in which a part of the holder 30 protrudes in the +H direction. However, the present disclosure is not particularly limited to this, instead of providing the communication through-hole 52 in the reinforcing plate 50, the reinforcing plate 50 may be provided with a protrusion portion protruding in the +H direction from the fixing plate 40 through the through-hole 43. It is needless to say that the reinforcing plate 50 may not be provided.

As described above, the liquid ejecting head 10 of the present embodiment further includes the holder 30 for holding the first head chip 20A and the second head chip 20B by interposing the first head chip 20A and the second head chip 20B between the fixing plate 40 and the holder 30. The holder 30 has the partition wall 31*a* that partitions the accommodation section 31 which is a space accommodating the first head chip 20A and the accommodation section 31 which is a space accommodating the second head chip 20B. The protection section includes the protrusion portion 37 which is a part that protrudes from the surface 40*a* of the fixing plate 40 in the ejection direction through the first through-hole 43 formed in the fixing plate 40, in the partition wall 31*a*. By forming the protection section with the protrusion portion 37 of the holder 30 in this manner, the number of components can be reduced and the cost can be reduced. Further, by using the protrusion portion 37 of the holder 30 as the protection section, the rigidity of the protection section can be increased even when the thickness of the protection section is reduced, as compared with the case where the protection section is separated from the holder 30. Therefore, the gap between the protrusion portion 37, which is the protection section, and the medium S can be made relatively narrow.

Further, in the liquid ejecting head 10 of the present embodiment, the protection section includes the protrusion portion 37 which is a part that protrudes from the surface 40*a* of the fixing plate 40 in the +H direction, which is the ejection direction, through the second through-hole 43 formed in the fixing plate 40, in the partition wall 31*a*. In addition, it is preferable that the first through-hole 43 and the second through-hole 43 be arranged with gaps in the +L direction, which is the first direction. By arranging the first through-hole 43 and the second through-hole 43 with gaps in the +L direction in this manner, it is possible to suppress the division of the fixing plate 40 on both sides in the W-axis direction with the protection section as a reference. Incidentally, when the fixing plate 40 is divided, the positioning accuracy between the head chip 20 fixed to one fixing plate 40 and the head chip 20 fixed to the other fixing plate 40 is lowered. By preventing the fixing plate 40 from being divided by the through-hole 43, it is possible to suppress a decrease in the positioning accuracy of the head chip 20.

Further, in the liquid ejecting head 10 of the present embodiment, the holder 30 has an outer peripheral wall surrounding the first head chip 20A and the second head chip 20B, the distal end of the outer peripheral wall is provided with the fixing region to which the fixing plate 40 is fixed, and the outer peripheral rib 34 provided on the outside of the fixing region and protruding from the surface 40*a* of the fixing plate 40 in the +H direction, which is the ejection direction. It is preferable that the distal end of the second outer peripheral rib 34*b* of the outer peripheral rib 34 in the +H direction and the distal end of the protrusion portion 37, which is the protection section, in the +H direction be at the same position with respect to the +H direction. By positioning the distal end of the protrusion portion 37 and the distal end of the second outer peripheral rib 34*b* at the same position in the +H direction, when performing the wiping by the wiping member 7 as illustrated in FIG. 11 of Embodiment 1 described above while being in contact with the second outer peripheral rib 34*b* and the protrusion portion 37, it is possible to evenly bring the wiping member 7 into contact with the ejection surface 100, and to suppress the wiping failures caused by the unwiped ink on the ejection surface 100.

Embodiment 4

Figure 17:
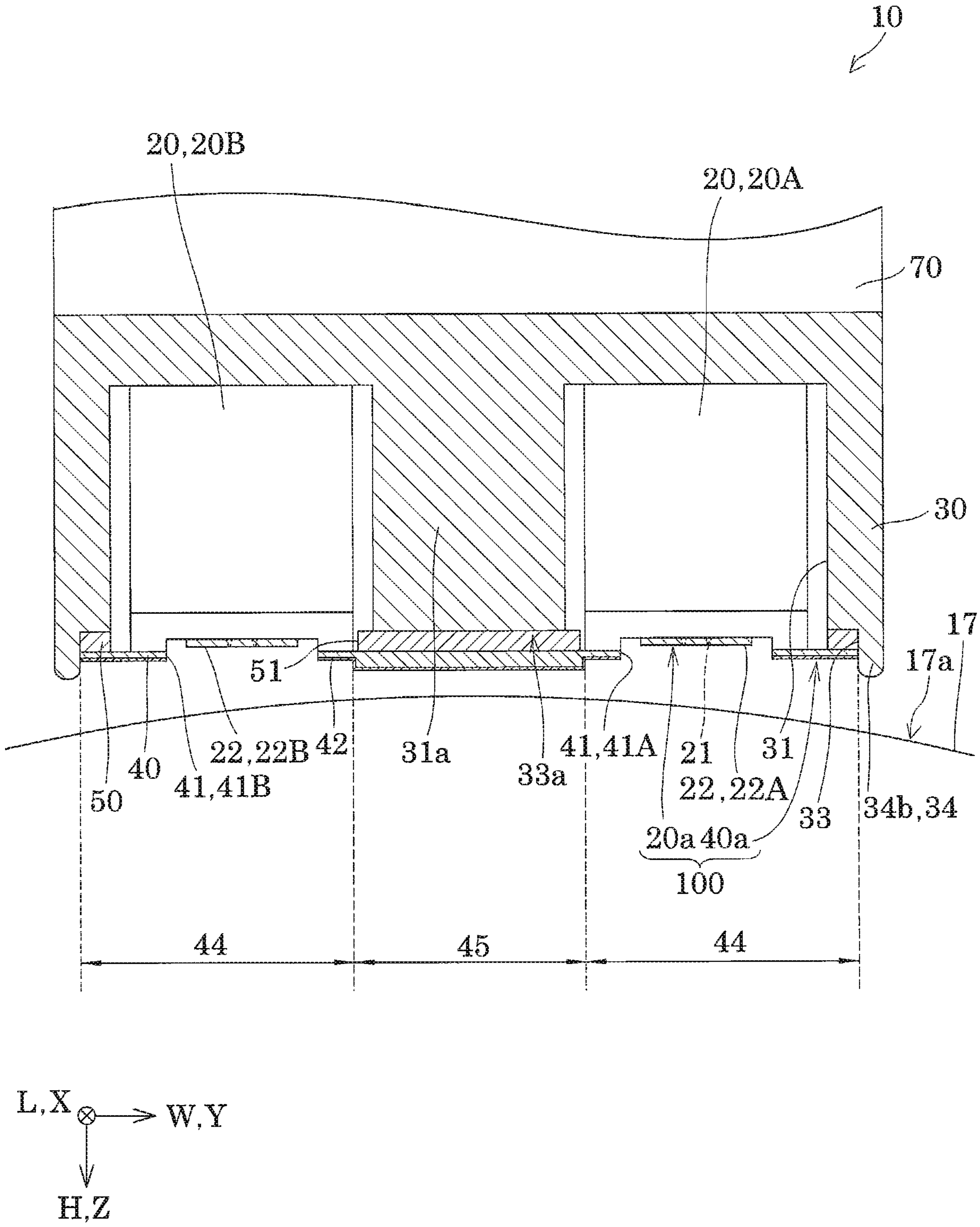
FIG. 17 is a sectional view of a main portion of a liquid ejecting head and a drum according to Embodiment 4.

FIG. 17 is a sectional view of a main portion of the liquid ejecting head 10 and the drum 17 according to Embodiment 4 of the present disclosure. The same reference numerals will be given to the same members as those in the above-described embodiment, and overlapping description thereof will be omitted.

As illustrated in the drawing, the liquid ejecting head 10 of the present embodiment includes the head chip 20, the holder 30, the fixing plate 40, the reinforcing plate 50, and the flow path member 70. Since the head chip 20, the holder 30, the reinforcing plate 50, and the flow path member 70 are the same as those in the above-described embodiments, the overlapping description thereof will be omitted.

The fixing plate 40 includes a base portion 44 and a thick portion 45 that is thicker in the H-axis direction than the base portion 44 and protrudes in the +H direction from a surface of the base portion 44 facing the +H direction. The base portion 44 is a part provided with the opening portion 41, and is provided on both sides in the W-axis direction. That is, in the +W direction, the base portion 44 provided with the first opening portion 41A and the third opening portion 41C is provided, and in the −W direction, the base portion 44 provided with the second opening portion 41B and the fourth opening portion 41D is provided. Although the third opening portion 41C and the fourth opening portion 41D are omitted in FIG. 17, the third opening portion 41C and the fourth opening portion 41D are provided at the same positions as in FIG. 15. Further, the thick portion 45 is provided integrally with the base portion 44 between the two base portions 44 in the W-axis direction. That is, the thick portion 45 is formed by making a part of the fixing plate 40 thicker in the +H direction. In the thick portion 45, a surface facing the −H direction is flush with the base portion 44, and a surface facing the +H direction is provided to protrude in the +H direction from the base portion 44. Therefore, the thick portion 45 of the present embodiment corresponds to the “protection section”. That is, the thick portion 45 is arranged at the same position as the protection section 61 of Embodiment 1 described above.

By providing the thick portion 45 in which a part of the fixing plate 40 is thickened in this manner, the rigidity of the thick portion 45 in the +H direction becomes higher than the rigidity of the base portion 44 in the +H direction. Therefore, even when the medium S comes into contact with the thick portion 45, it is possible to suppress the deformation of the base portion 44 of the fixing plate 40, and to suppress the peeling of the fixing plate 40 from the head chip 20.

Figure 18:
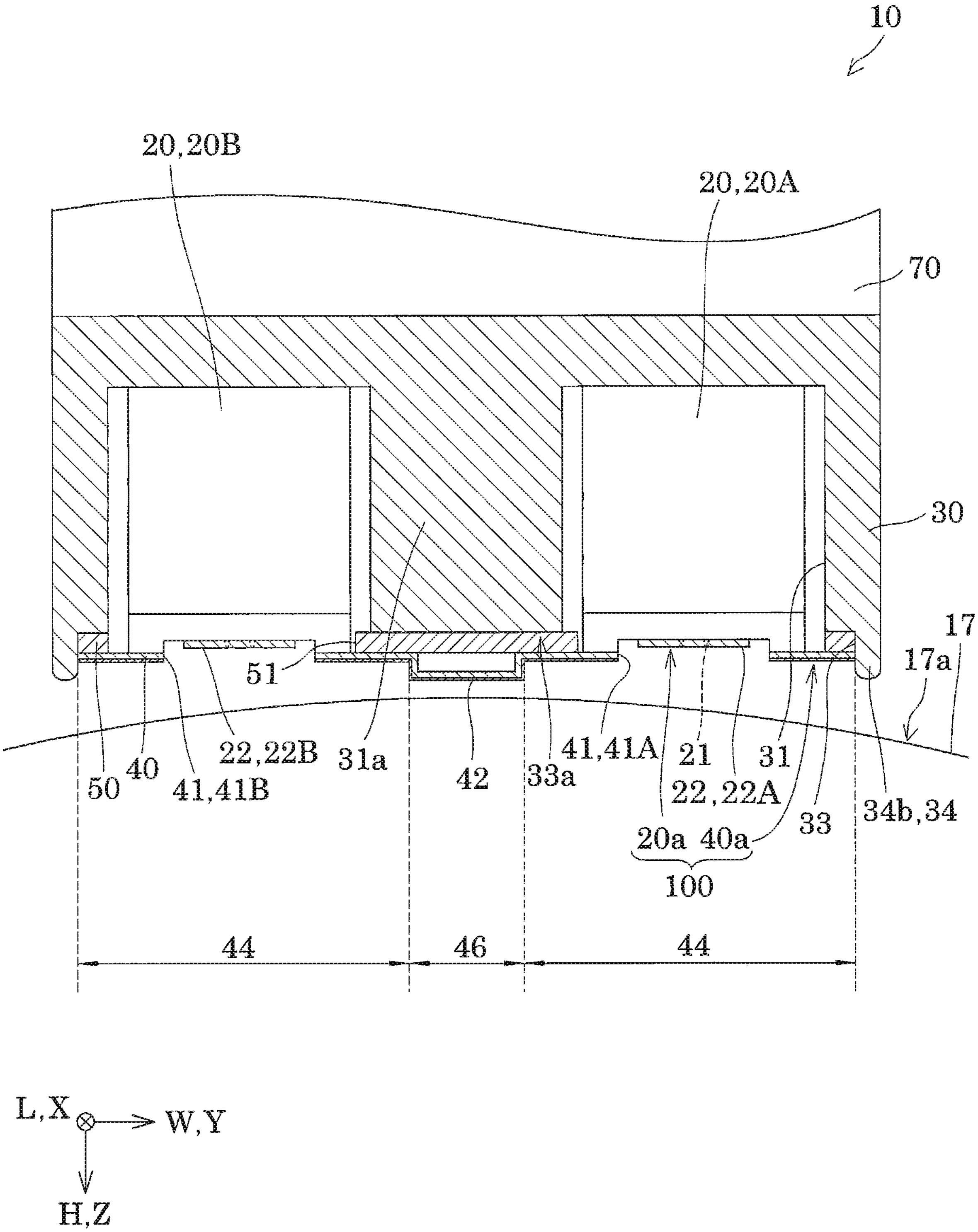
FIG. 18 is a sectional view of a main portion illustrating a modification example of the liquid ejecting head according to Embodiment 4.

In the present embodiment, the thick portion 45 in which a part of the fixing plate 40 is thickened is used as the protection section, but the present embodiment is not particularly limited thereto. Here, a modification example of the fixing plate 40 and the protection section is illustrated in FIG. 18. FIG. 18 is a sectional view of a main portion illustrating a modification example of the liquid ejecting head 10 according to Embodiment 4 of the present disclosure.

As illustrated in FIG. 18, the fixing plate 40 has the base portion 44 and a bent portion 46 that protrudes from the base portion 44 in the +H direction by bending. The bent portion 46 and the base portion 44 are formed by bending a plate-shaped member having the same thickness. The bent portion 46 of the present embodiment corresponds to a “protection section”. That is, the bent portion 46 is arranged at the same position as the protection section 61 of Embodiment 1 described above.

Even when the protection section is formed by forming the thick portion 45 in which a part of the fixing plate 40 is thickened or by forming the bent portion 46 in this manner, the protection section makes it difficult for the medium S to come into contact with the base portion 44 of the fixing plate 40, and can suppress the deformation and peeling of the fixing plate 40 due to the contact of the medium S. It is needless to say that the thick portion 45 and the bent portion 46 may be combined to make a part of the bent portion 46 thicker than the base portion 44.

Other Embodiments

Although each embodiment of the present disclosure has been described above, the basic configuration of the present disclosure is not limited to the above-described one.

Figure 19:
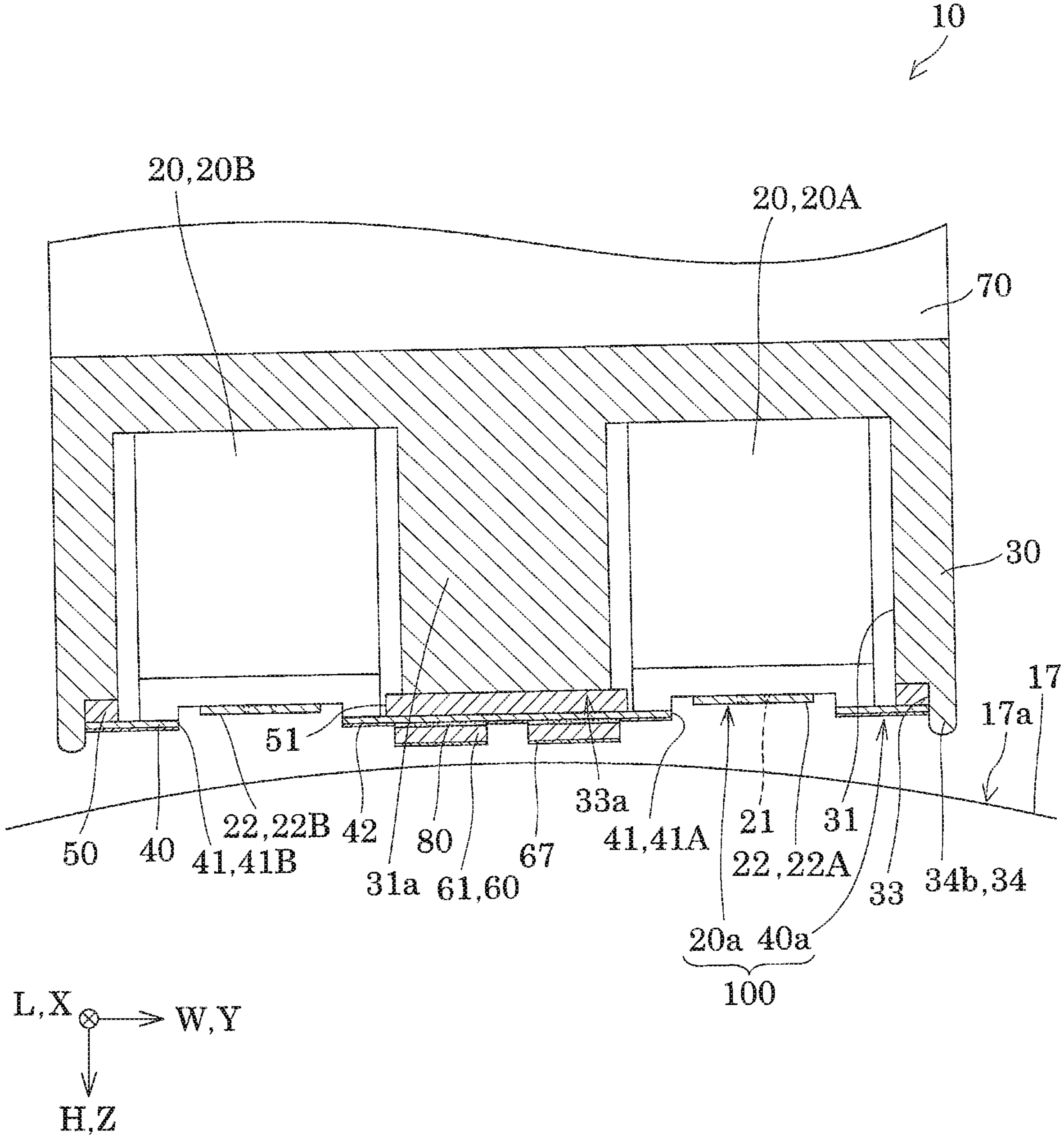
FIG. 19 is a sectional view of a main portion of a liquid ejecting head and a drum according to another embodiment.

For example, in each of the above-described embodiments, one protection section is provided between the first head chip 20A and the second head chip 20B in the W-axis direction, but the present disclosure is not particularly limited thereto. Here, a modification example of the protection section 61 of Embodiment 2 is illustrated in FIG. 19. FIG. 19 is a sectional view of a main portion showing a modification example of the liquid ejecting head 10 of Embodiment 2. As illustrated in FIG. 19, two protection sections 61 are arranged side by side in the W-axis direction. It is needless to say that the number of protection sections 61 is not limited to this, and may be three or more. In this manner, by providing a plurality of the protection sections 61 in the W-axis direction, the protection sections 61 can suppress the contact of the medium S with the fixing plate 40. It should be noted that the plurality of such protection sections 61 provided in the W-axis direction can be similarly applied to Embodiments 1, 3, and 4 described above.

Figure 20:
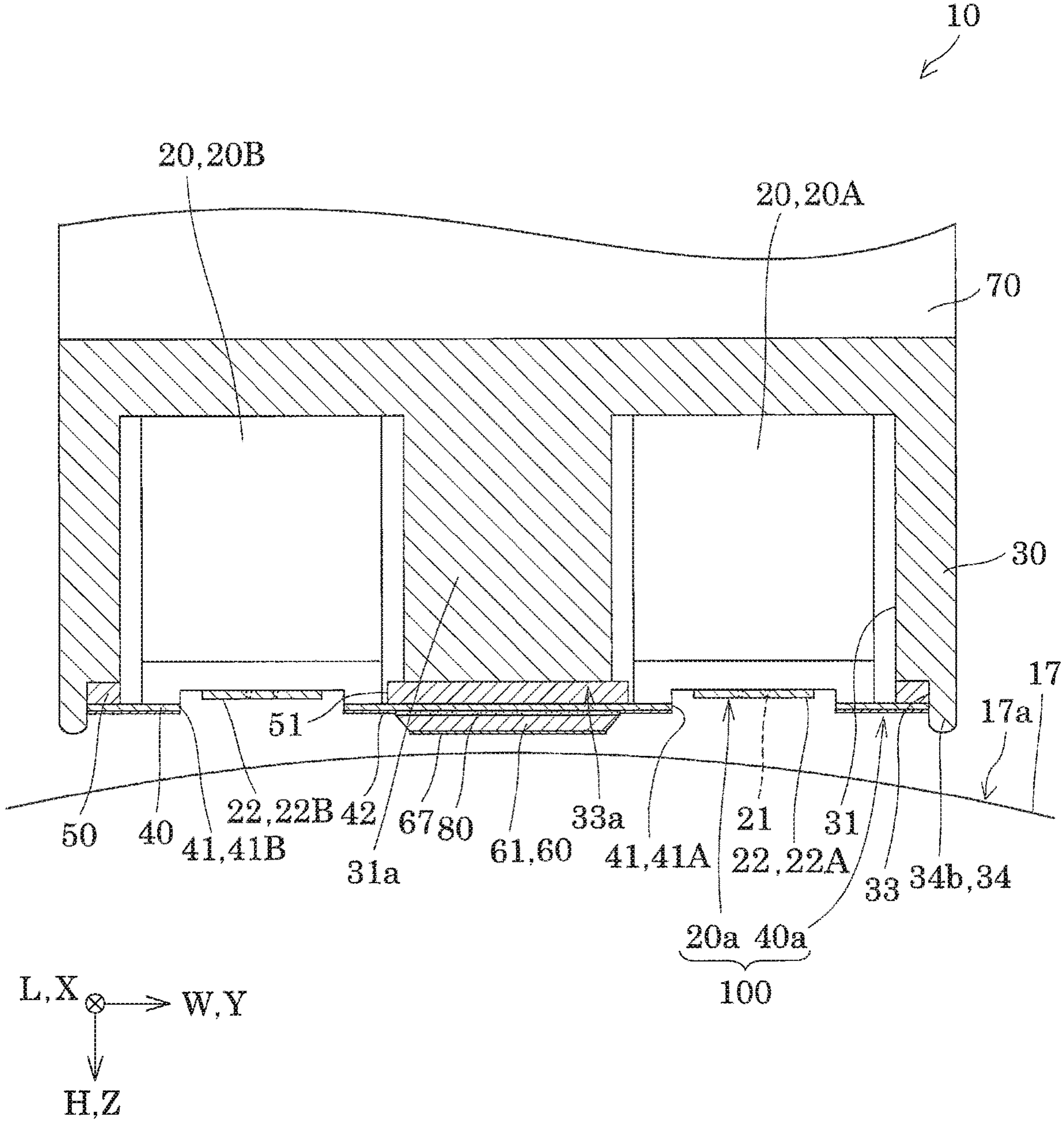
FIG. 20 is a sectional view of a main portion of a liquid ejecting head and a drum according to another embodiment.

Further, the shape of the protection section is not limited to each of the above-described embodiments. Here, a modification example of the protection section 61 of Embodiment 2 is illustrated in FIG. 20. FIG. 20 is a sectional view of a main portion showing a modification example of the liquid ejecting head 10 of Embodiment 2. As illustrated in FIG. 20, the protection section 61 is provided with a width in the W-axis direction gradually decreasing in the +H direction. That is, the cross-sectional shape of the protection section 61 along the W-axis direction has a trapezoidal shape. That is, the side surfaces of the protection section 61 on both sides in the W-axis direction are inclined surfaces that are inclined with respect to the H-axis direction. By providing the inclined surface in the protection section 61 in this manner, it is difficult for ink to collect at the boundary part between the ejection surface 100 and the inclined surface, and the ink at the boundary part between the ejection surface 100 and the inclined surface can be eliminated by performing wiping with the wiping member 7. Further, since the cross-sectional shape of the protection section 61 along the W-axis direction is a trapezoid, and the distal end surface of the protection section 61 in the +H direction is a plane along the LW plane, ink adhering to the protection section 61 is less likely to fall compared to the shape in which the distal end of the protection section 61 in the +H direction is sharpened. In particular, since the liquid repellent film 67 is provided on the surface of the protection section 61 facing the +H direction, when the distal end of the protection section 61 in the +H direction is sharpened, the ink adhering to the protection section 61 is likely to fall. However, by forming the distal end surface of the protection section 61 in the +H direction as a flat surface along the LW plane, the ink does not easily fall even when the liquid repellent film 67 is provided.

Figure 21:
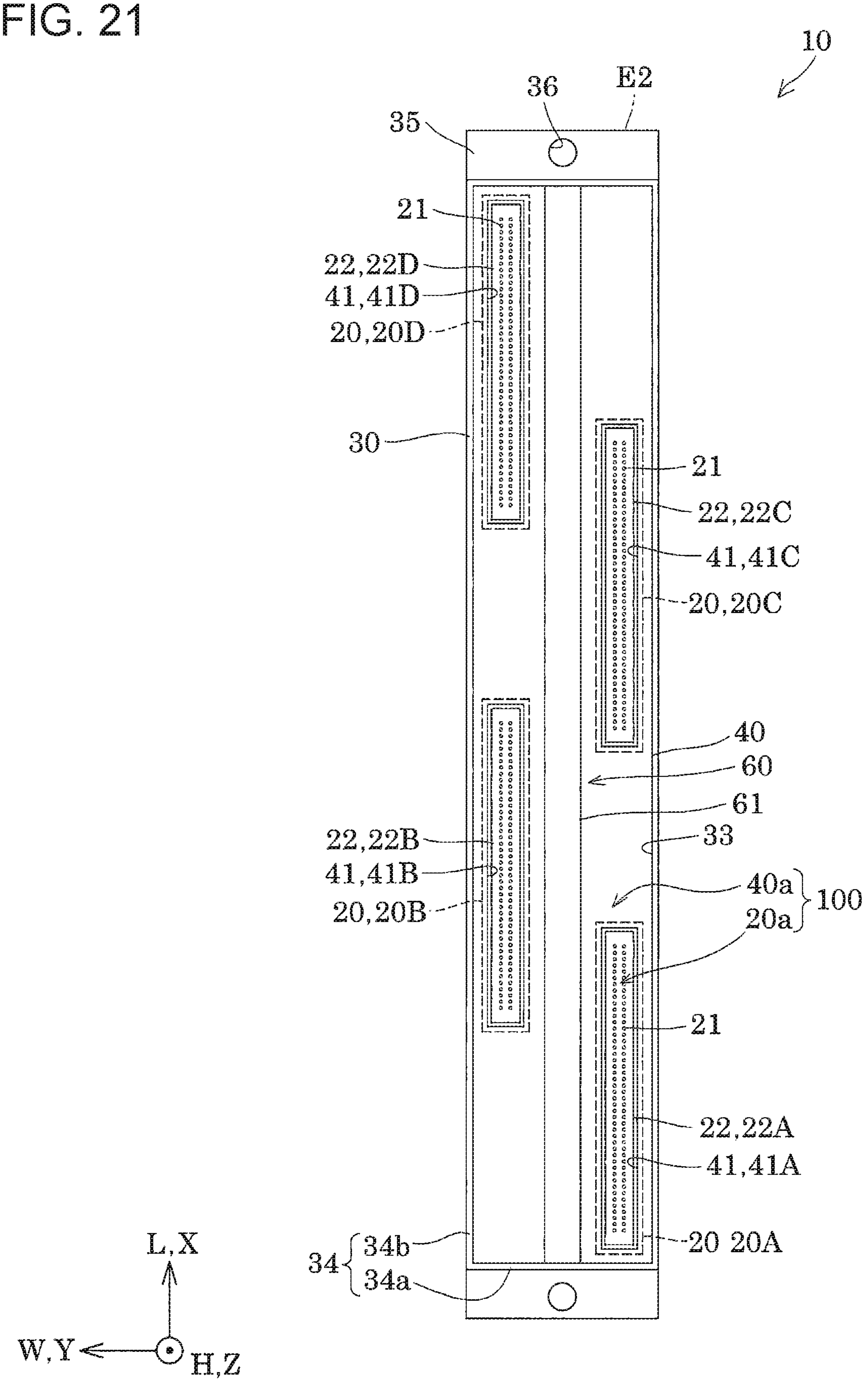
FIG. 21 is a bottom view of a liquid ejecting head according to another embodiment.

Further, in each of the above-described embodiments, the ejection surface 100 of the liquid ejecting head 10 has a shape having the first part P1, the second part P2, and the third part P3 when viewed in the −H direction, but the present disclosure is not particularly limited thereto. Here, a modification example of the liquid ejecting head 10 is illustrated in FIG. 21. In addition, FIG. 21 is a bottom view of the liquid ejecting head 10 when viewed in the −H direction. As illustrated in FIG. 21, in the liquid ejecting head 10, four head chips 20 are arranged in a staggered manner in the L-axis direction. Further, the ejection surface 100 of the liquid ejecting head 10 has a rectangular shape when viewed in the −H direction. The liquid ejecting head 10 has a rectangular shape when viewed in the −H direction. It is needless to say that only one of the outer shape of the liquid ejecting head 10 and the ejection surface 100 when viewed in the −H direction may be rectangular. As described above, even when the ejection surface 100 of the liquid ejecting head 10 has a rectangular shape when viewed in the −H direction, by providing the protection section of each of the above-described embodiments between the first head chip 20A and the second head chip 20B, it is possible to suppress the contact of the medium S with the fixing plate 40.

Figure 22:
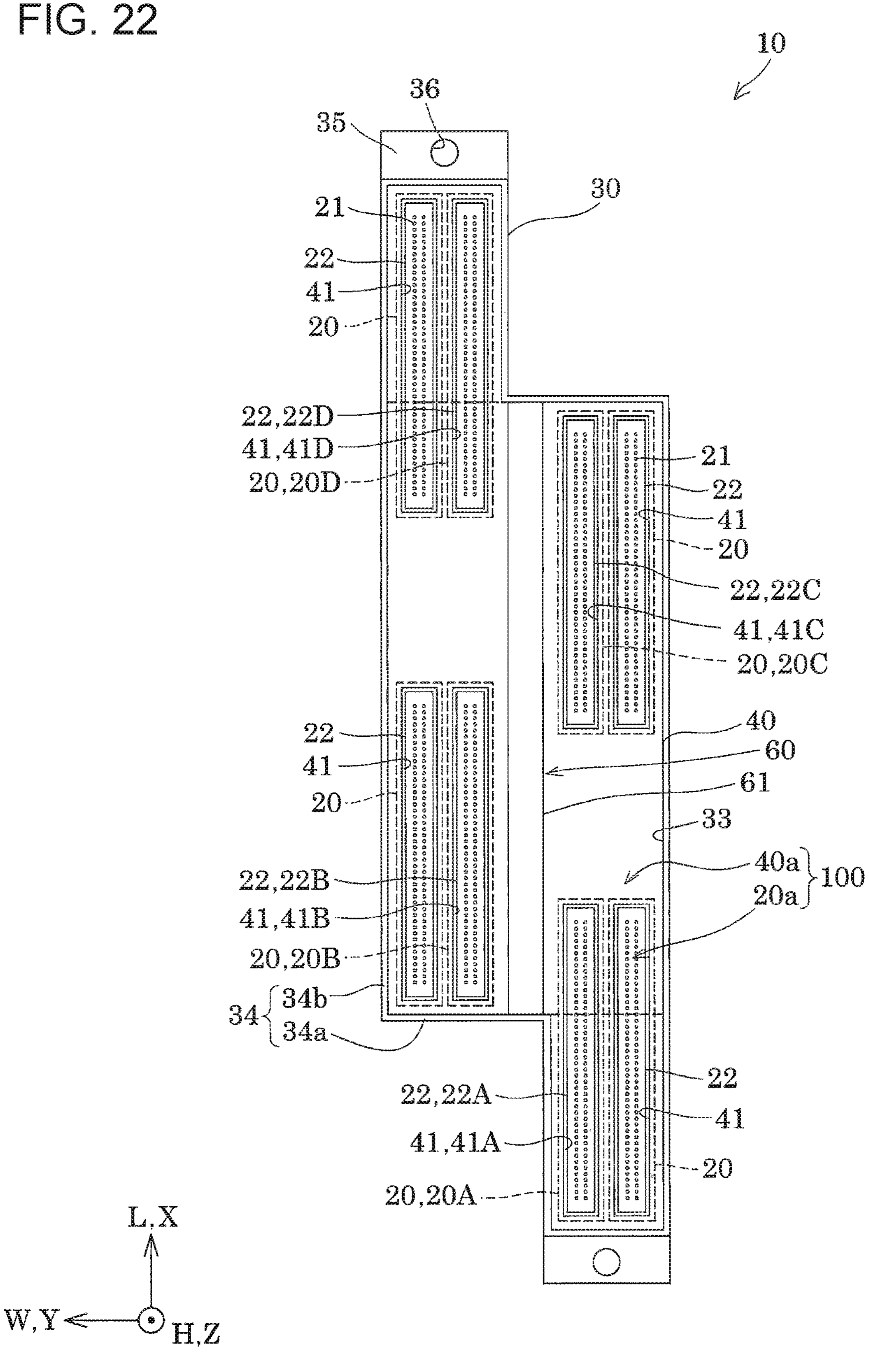
FIG. 22 is a bottom view of a liquid ejecting head according to another embodiment.

Further, in each of the above-described embodiments, one liquid ejecting head 10 is configured to have four head chips 20, but the number of head chips 20 is not particularly limited thereto. For example, the liquid ejecting head 10 may have a configuration having two head chips 20 or a configuration having three or more head chips 20. Here, a modification example of the liquid ejecting head 10 is illustrated in FIG. 22. In addition, FIG. 22 is a bottom view of the liquid ejecting head 10 when viewed in the −H direction. As illustrated in FIG. 22, in the liquid ejecting head 10, a set composed of two head chips 20 arranged at the same position in the L-axis direction are arranged in a staggered manner in the L-axis direction. Of the two head chips 20 constituting one set, the head chips 20 adjacent to another set arranged at different positions in the W-axis direction or the transport direction FD are the first head chips 20A. Of the two head chips 20 constituting the other set, the head chip 20 adjacent to the first head chip 20A is the second head chip 20B, and the protection section 61 is arranged between the first head chip 20A and the second head chip 20B. In other words, the protection section 61 is arranged between the set of two head chips 20 arranged on one side in the W-axis direction and the set of two head chips 20 arranged on the other side in the W-axis direction. Further, of the two head chips 20 constituting the set having the same position in the W-axis direction and different positions in the L-axis direction with respect to the set including the first head chip 20A, the head chip 20 adjacent to the second head chip 20B is the third head chip 20C. Of the two head chips 20 constituting the set having the same position in the W-axis direction and different positions in the L-axis direction with respect to the set including the second head chip 20B, the head chip 20 adjacent to the third head chip 20C is the fourth head chip 20D. In addition, the protection section 61 is arranged between the third head chip 20C and the fourth head chip 20D. A set composed of three or more head chips 20 arranged at the same position in the L-axis direction may be arranged in a staggered pattern in the L-axis direction, and may be arranged apart from each other in the W-axis direction, and the protection section 61 may be arranged between the sets.

Figure 23:
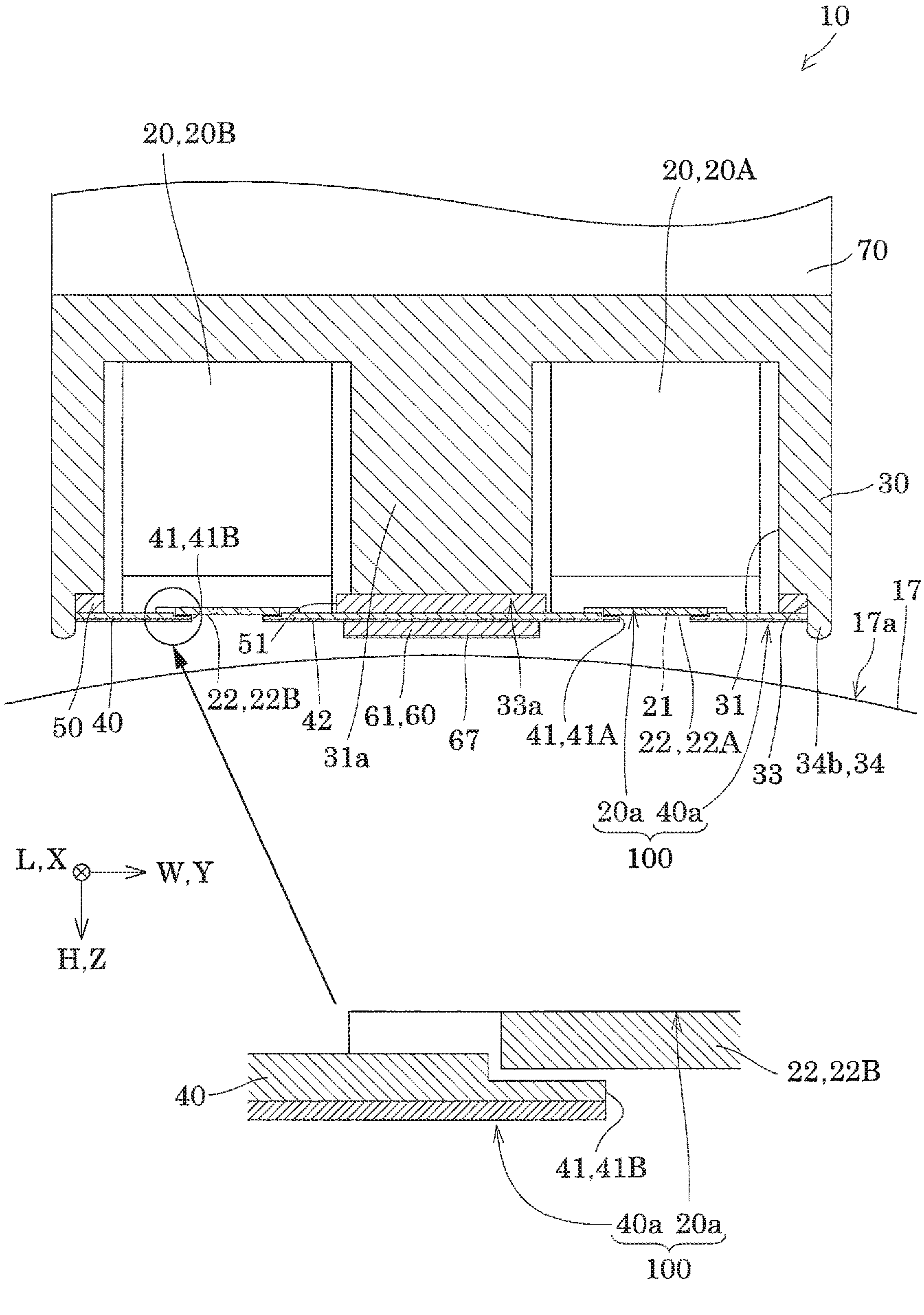
FIG. 23 is a sectional view of a main portion of a liquid ejecting head and a drum according to another embodiment.

Further, in each of the above-described embodiments, the opening portion 41 of the fixing plate 40 exposes the entire surface of the nozzle plate 22, but the present disclosure is not particularly limited thereto. Here, a modification example of the fixing plate 40 is illustrated in FIG. 23. FIG. 23 is a sectional view of a main portion of the liquid ejecting head 10. As illustrated in FIG. 23, the opening area of the opening portion 41 of the fixing plate 40 is smaller than that of the nozzle plate 22. That is, the opening edge portion of the opening portion 41 of the fixing plate 40 is arranged at a position overlapping the nozzle plate 22 when viewed in the +H direction. Even in such a configuration, by providing the protection section of each of the above-described embodiments, it is possible to suppress the contact of the medium S with the fixing plate 40.

Further, in each of the above-described embodiments, the drum 17 is provided as the “cylindrical member”, the medium S is transported to the surface 17*a* of the drum 17, and printing is performed. However, the present disclosure is not particularly limited thereto, and for example, the medium S itself may have a curved surface, and printing may be performed by ejecting liquid from the liquid ejecting head onto the medium S rotating around the rotation shaft. That is, the medium S may be an example of a “cylindrical member”. For example, the cross-sectional shape of the medium S may be a so-called rounded rectangular shape (also referred to as a track shape) in which both end portions in the longitudinal direction are formed into a semicircular shape based on a circular, elliptical, or rectangular shape. Further, the medium S may have a tubular shape, a columnar shape, or a cone shape. Further, the rotation shaft of the medium S extends along the +L direction which is the longitudinal direction of the head chip. When the medium S itself rotates, the transport direction of the medium S is the rotation direction of the medium S. However, the "transport direction" of the medium S with respect to the ejection surface 100 of the liquid ejecting head 10 is the extending direction of the tangent line of the surface of the medium S with respect to the liquid ejecting head 10 and the liquid ejecting head unit 8.

Furthermore, the present disclosure is broadly applicable to liquid ejecting heads in general, and examples thereof include recording heads, such as various types of ink jet type recording heads used in image recording apparatus, such as printers, a color material ejecting head used for manufacturing a color filter, such as a liquid crystal display, an electrode material ejecting head used for forming electrodes, such as an organic EL display or a field emission display (FED), and a bioorganic material ejecting head used for manufacturing a bio chip. Further, the present disclosure can also be applied to the liquid ejecting head unit including these liquid ejecting heads, and the liquid ejecting apparatus.

What is claimed is:

1. A liquid ejecting head comprising:

a first head chip including a first nozzle plate formed with nozzles configured to eject liquid in an ejection direction, and having a first direction as a longitudinal direction when viewed in the ejection direction;

a second head chip including a second nozzle plate formed with nozzles configure to eject liquid in the ejection direction, and having the first direction as a longitudinal direction when viewed in the ejection direction;

a fixing plate which has a first opening portion exposing at least a part of the first nozzle plate and a second opening portion exposing at least a part of the second nozzle plate, and to which the first head chip and the second head chip are fixed; and a protection section protruding in the ejection direction from a surface of the fixing plate formed with the first opening portion, wherein the first head chip and the second head chip are shifted from each other regarding the first direction and a second direction orthogonal to both the ejection direction and the first direction, and partially overlap each other when viewed in the second direction, the protection section is arranged between the first head chip and the second head chip regarding the second direction, and the protection section does not overlap with the first head chip and the second head chip when viewed in the ejection direction.

2. The liquid ejecting head according to claim 1, wherein the protection section is arranged at a center position of the fixing plate regarding the second direction.

3. The liquid ejecting head according to claim 1, wherein the protection section is arranged at a center position between the first head chip and the second head chip regarding the second direction.

4. The liquid ejecting head according to claim 1, wherein rigidity of the protection section is higher than rigidity of the fixing plate.

5. The liquid ejecting head according to claim 1, wherein the protection section and the fixing plate are separate bodies, and Young's modulus of a material constituting the protection section is higher than Young's modulus of a material constituting the fixing plate.

6. The liquid ejecting head according to claim 1, wherein a thickness of the protection section regarding the ejection direction is thicker than a thickness of the fixing plate regarding the ejection direction.

7. The liquid ejecting head according to claim 1, further comprising:

a holder for holding the first head chip and the second head chip by interposing the first head chip and the second head chip between the fixing plate and the holder, wherein the holder has a partition wall that partitions a space accommodating the first head chip and a space accommodating the second head chip, and the protection section has a part of the partition wall that protrudes from the surface of the fixing plate in the ejection direction through a first through-hole formed in the fixing plate.

8. The liquid ejecting head according to claim 7, wherein the protection section has a part of the partition wall that protrudes from the surface of the fixing plate in the ejection direction through a second through-hole formed in the fixing plate, and the first through-hole and the second through-hole are arranged with a gap in the first direction.

9. The liquid ejecting head according to claim 7, wherein the holder has an outer peripheral wall surrounding the first head chip and the second head chip, a distal end of the outer peripheral wall is provided with a fixing region to which the fixing plate is fixed, and an outer peripheral rib provided on an outside of the fixing region and protruding from the surface of the fixing plate in the ejection direction, and a distal end of the outer peripheral rib in the ejection direction and a distal end of the protection section in the ejection direction are at the same position with respect to the ejection direction.

10. The liquid ejecting head according to claim 1, wherein the protection section is detachably attached to the fixing plate.

11. The liquid ejecting head according to claim 1, wherein a dimension of the protection section regarding the second direction is greater than a dimension of the protection section regarding the ejection direction.

12. The liquid ejecting head according to claim 1, further comprising:

a third head chip including a third nozzle plate formed with nozzles configured to eject liquid in the ejection direction, and having the first direction as a longitudinal direction when viewed in the ejection direction; and a fourth head chip including a fourth nozzle plate formed with nozzles configured to eject liquid in the ejection direction, and having the first direction as a longitudinal direction when viewed in the ejection direction, wherein the fixing plate has a third opening portion exposing at least a part of the third nozzle plate and a fourth opening portion exposing at least a part of the fourth nozzle plate, and has the third head chip and the fourth head chip that are fixed thereto, the first head chip and the third head chip are arranged side by side in the first direction, the second head chip and the fourth head chip are arranged side by side in the first direction, one end of the third head chip overlaps a part of the second head chip when viewed in the second direction, the other end of the third head chip overlaps a part of the fourth head chip when viewed in the second direction, and the protection section is arranged between the second head chip and the third head chip and between the third head chip and the fourth head chip regarding the second direction.

13. A liquid ejecting apparatus comprising:

a cylindrical member that rotates around a rotation shaft extending in a first direction; and the liquid ejecting head according to claim 1, which is arranged along the cylindrical member, wherein when a tangent plane at a specific position on a surface of the cylindrical member is parallel to the surface of the fixing plate when viewed in the first direction, a normal line of the tangent plane at the specific position overlaps the protection section.

14. A liquid ejecting apparatus comprising:

the liquid ejecting head according to claim 1; and a wiping member that wipes an ejection surface including the first nozzle plate, the second nozzle plate, and the surface of the fixing plate, wherein the wiping member wipes the ejection surface while moving relative to the liquid ejecting head in the first direction.

15. The liquid ejecting head according to claim 1, wherein the protection section includes a portion overlapping with a region being defined by an outer peripheral edge of the fixing plate when viewed in the ejection direction and the portion of the protection section is not arranged in the first direction with respect to the first opening portion.

16. The liquid ejecting head according to claim 1, wherein the first opening portion exposing an entire surface of the first nozzle plate facing the ejection direction and the second opening portion exposing an entire surface the second nozzle plate facing the ejection direction.

17. A liquid ejecting head configured to eject liquid to a medium moving in a transport direction, comprising:

a first head chip including a first nozzle plate formed with nozzles configured to eject liquid in an ejection direction;

a second head chip including a second nozzle plate formed with nozzles configured to eject liquid in the ejection direction;

a fixing plate which has a first opening portion exposing at least a part of the first nozzle plate and a second opening portion exposing at least a part of the second nozzle plate, and to which the first head chip and the second head chip are fixed; and a protection section protruding in the ejection direction from a surface of the fixing plate formed with the first opening portion, wherein the first head chip and the second head chip are adjacent each other in the transport direction, the protection section is arranged between the first head chip and the second head chip regarding the transport direction, and the protection section does not overlap with the first head chip and the second head chip when viewed in the ejection direction.

18. A liquid ejecting apparatus comprising:

a cylindrical member that rotates around a rotation shaft extending in a first direction orthogonal to both the transport direction and the ejection direction; and the liquid ejecting head according to claim 17, which is arranged along the cylindrical member, wherein when a tangent plane at a specific position on a surface of the cylindrical member is parallel to the surface of the fixing plate when viewed in the first direction, a normal line of the tangent plane at the specific position overlaps the protection section.

19. A liquid ejecting apparatus comprising:

the liquid ejecting head according to claim 17; and a wiping member that wipes an ejection surface including the first nozzle plate, the second nozzle plate, and the surface of the fixing plate, wherein the wiping member wipes the ejection surface while moving relative to the liquid ejecting head in a direction orthogonal to both the transport direction and the ejection direction.

20. A liquid ejecting head unit comprising:

a liquid ejecting head configured to eject liquid to a medium moving in a transport direction, and includes a first head chip including a first nozzle plate formed with nozzles configured to eject liquid in an ejection direction, a second head chip including a second nozzle plate formed with nozzles configured to eject liquid in the ejection direction, and a fixing plate which has a first opening portion exposing at least a part of the first nozzle plate and a second opening portion exposing at least a part of the second nozzle plate, and to which the first head chip and the second head chip are fixed;

a protection section protruding in the ejection direction from a surface of the fixing plate formed with the first opening portion; and a support member for supporting the liquid ejecting head, wherein the first head chip and the second head chip are adjacent each other in the transport direction, the protection section is detachably attached to the fixing plate by being interposed between the liquid ejecting head and the support member, and is arranged between the first head chip and the second head chip in the transport direction, and the protection section does not overlap with the first head chip and the second head chip when viewed in the ejection direction.

* * * * *